United States Patent
DiFelice et al.

(10) Patent No.: US 10,067,284 B1
(45) Date of Patent: Sep. 4, 2018

(54) EDGE-LIT LIGHT GUIDE LUMINAIRE WITH A REMOVABLE OPTICAL DEVICE

(71) Applicants: Eric DiFelice, Aurora, CO (US); Patrick Neal Walker, Peachtree City, GA (US)

(72) Inventors: Eric DiFelice, Aurora, CO (US); Patrick Neal Walker, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 162 days.

(21) Appl. No.: 15/135,206

(22) Filed: Apr. 21, 2016

(51) Int. Cl.
  *F21V 8/00* (2006.01)
(52) U.S. Cl.
  CPC ......... *G02B 6/0085* (2013.01); *G02B 6/0051* (2013.01); *G02B 6/0055* (2013.01); *G02B 6/0068* (2013.01); *G02B 6/0088* (2013.01)
(58) Field of Classification Search
  CPC ..... G02B 6/0085; F21S 8/026; F21Y 2115/10
  See application file for complete search history.

(56) References Cited

U.S. PATENT DOCUMENTS

| | | | |
|---|---|---|---|
| D611,183 S | 3/2010 | Duarte | |
| D653,376 S | 1/2012 | Kong et al. | |
| D657,904 S | 4/2012 | Mayfield, III et al. | |
| D665,119 S | 8/2012 | Bryant | |
| D677,820 S | 3/2013 | Mayfield, III et al. | |
| D696,449 S | 12/2013 | Boyer et al. | |
| D698,973 S | 2/2014 | Santoro et al. | |
| D698,975 S | 2/2014 | Blessitt et al. | |
| D701,341 S | 3/2014 | Mayfield, III et al. | |
| D701,988 S | 4/2014 | Clements | |
| D708,873 S | 7/2014 | Wehner et al. | |
| 8,794,812 B2 * | 8/2014 | Coleman | F21S 8/04 362/606 |
| 8,853,942 B1 * | 10/2014 | Lewis, Jr. | F21V 7/04 313/612 |
| 9,110,209 B2 * | 8/2015 | Blessitt | G02B 6/0055 |
| D767,193 S | 9/2016 | Jung | |

FOREIGN PATENT DOCUMENTS

DE     102009001170 A1 *  9/2010  ............ F21V 29/004

* cited by examiner

*Primary Examiner* — Robert May
(74) *Attorney, Agent, or Firm* — King & Spalding LLP

(57) ABSTRACT

A lighting fixture includes a first end plate and a second end plate that are coupled to and disposed on opposite sides of a reflector panel. Further, the lighting fixture includes a pair of elongated heat sinks that are coupled to the first end plate and the second end plate on opposite latitudinal ends of the pair of elongated heat sinks. Each elongated heat sink retains a longitudinal edge of a light guide and/or a plurality of LEDs directed towards the longitudinal edge. Further, the lighting fixture includes an optical device that is removably coupled to the lighting fixture such that the first end plate, the second end plate, and the pair of elongated heat sinks retain and overlap a perimeter of an optical device to prevent light leakage. The light guide is oriented horizontally and the optical device is oriented to receive light exiting the light guide.

19 Claims, 15 Drawing Sheets

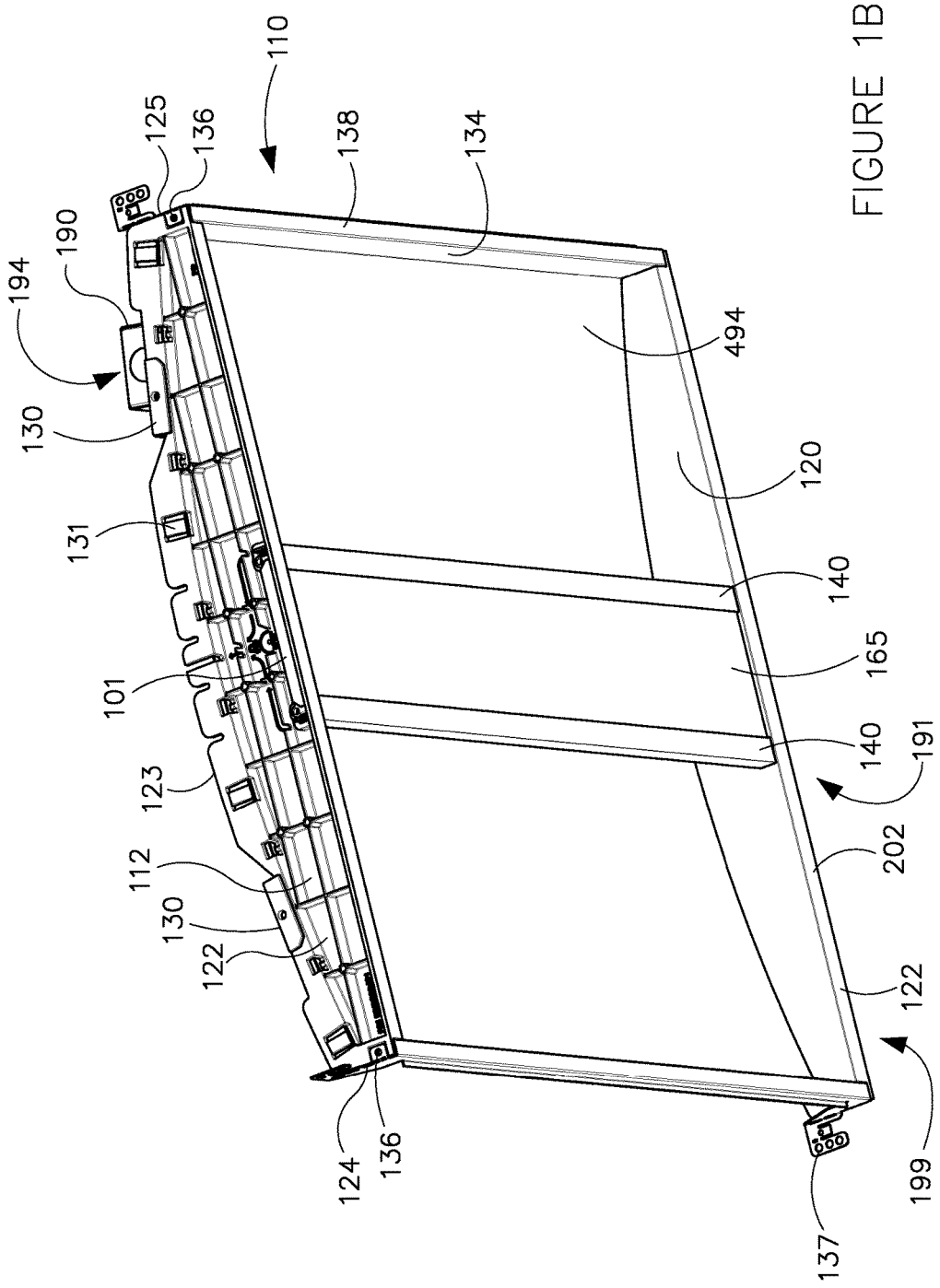

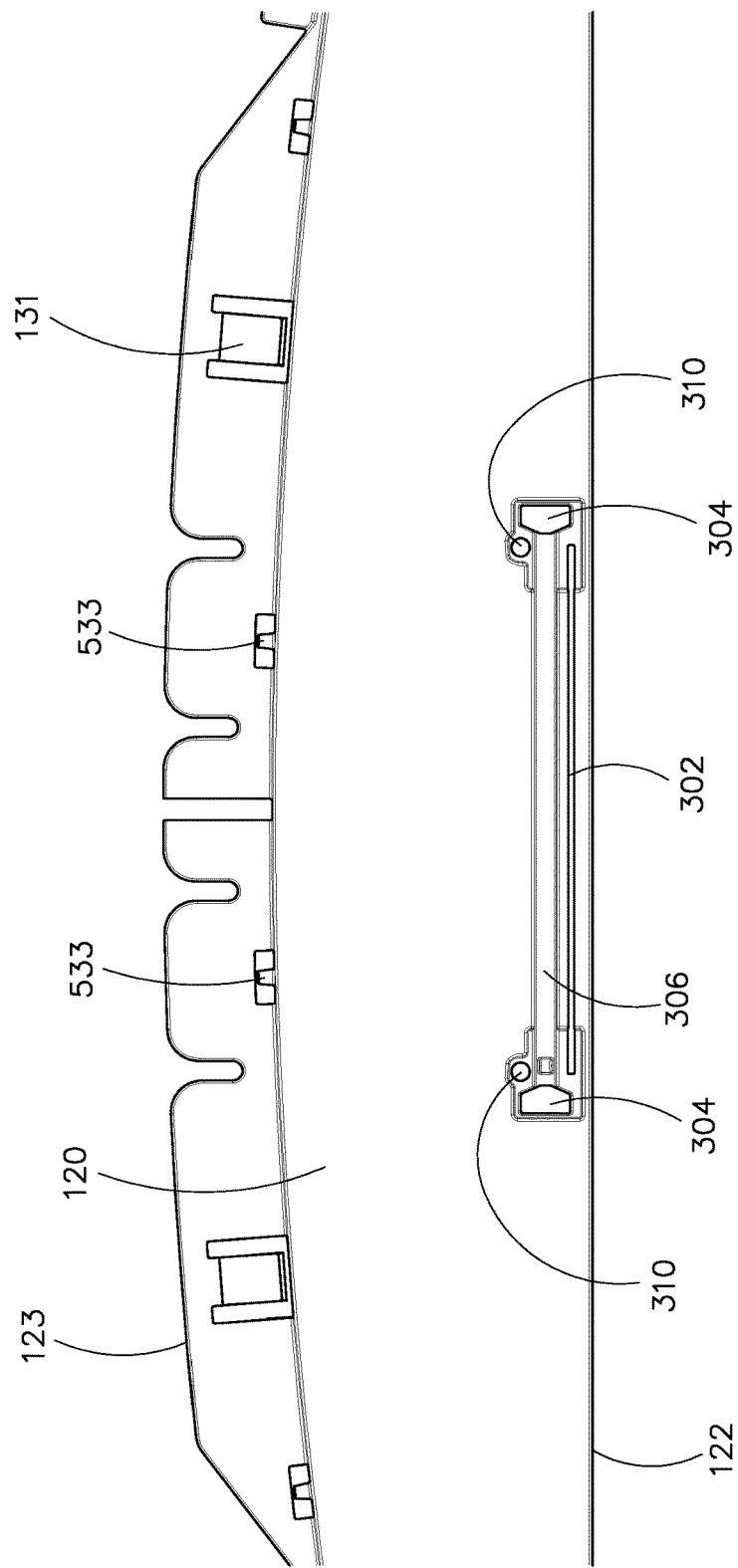

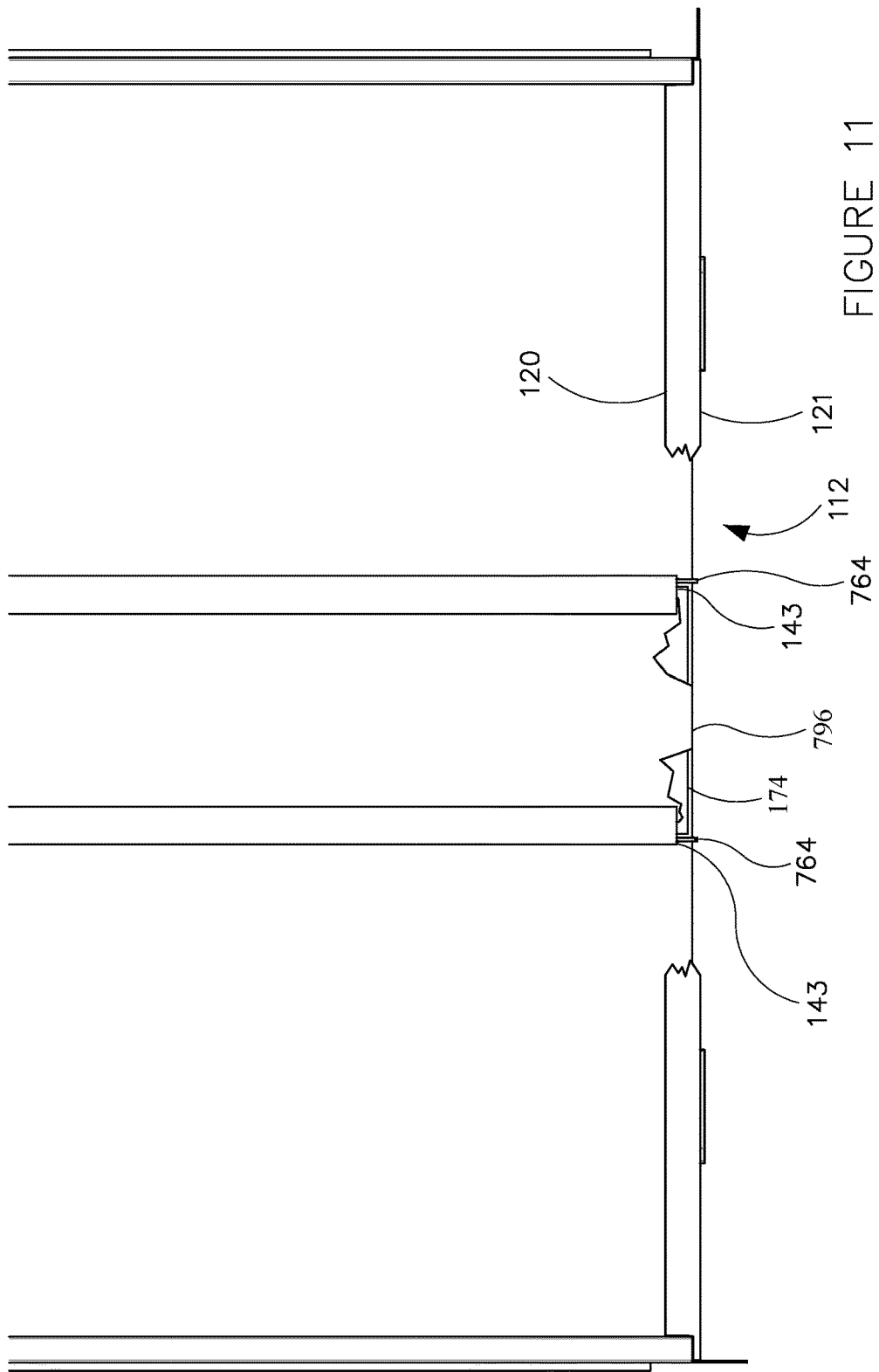

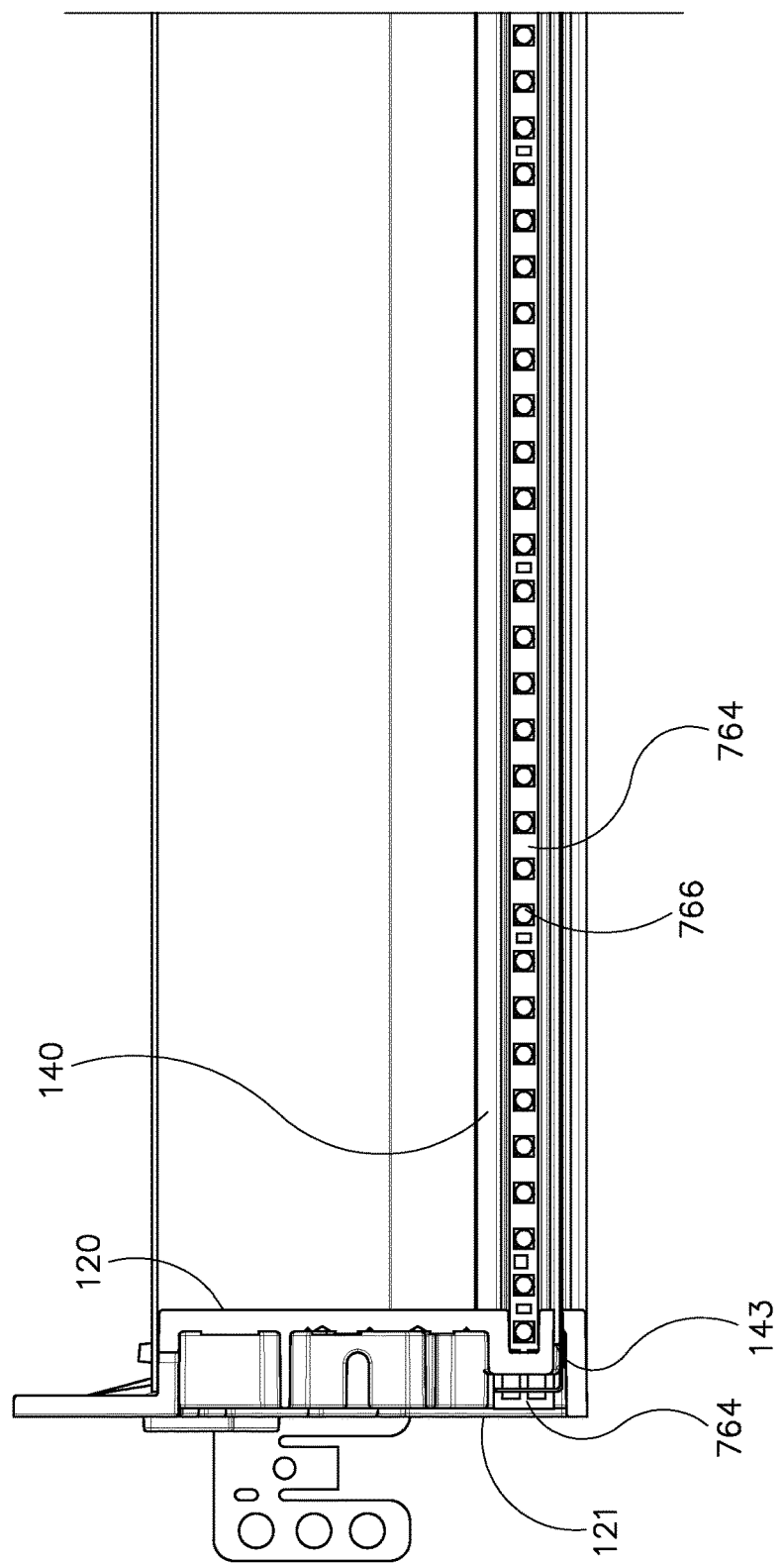

EDGE-LIT LIGHT GUIDE LUMINAIRE WITH A REMOVABLE OPTICAL DEVICE

TECHNICAL FIELD

The present disclosure relates generally to lighting fixtures. More specifically, the present disclosure relates to a system, method, and/or apparatus for light control in edge-lit light guide luminaires.

BACKGROUND

Light sources in conventional edge-lit light guide luminaires may produce visual hot spots of light, i.e., non-uniform brightness or glare across the light guide that is undesirable to a user. Typically, the hot spot effect may be suppressed by using diffusers and/or reflectors. However, while the diffusers and/or reflectors are capable of suppressing the hot spot effect to a certain degree, they are still not satisfactory because of light leakage around the perimeter of the diffusers and/or reflectors in conventional edge-lit light guide luminaires. Such light leakage from around the perimeter of the diffusers and/or reflectors may create an undesirable visual effect and further reduce the efficiency of the luminaire. Furthermore, conventional luminaires may not be configured for easy replacement of an already installed diffuser and/or reflector once the luminaire is installed and operational. Thus, there remains a need for an edge-lit light guide luminaire that can satisfactorily suppress the hot spot effect on the light guide, while enabling easy installation/replacement of a diffuser and/or reflector and preventing light leakage from the perimeter of the diffuser and/or reflector.

SUMMARY

In one aspect, the present disclosure can relate to a lighting fixture. The lighting fixture includes a pair of elongated heat sinks disposed opposite to each other. Further, the lighting fixture includes a pair of end plates. Each end plate is disposed on opposite ends of the pair of elongated heat sinks, respectively, such that the pair of end plates overlap the opposite ends of the pair of elongated heat sinks. Furthermore, the lighting fixture includes a light guide that includes a first surface, a second surface opposite to the first surface, and a plurality of edges. At least a pair of opposite edges of the plurality of edges is retained by the pair of elongated heat sinks, respectively. Additionally, the lighting fixture includes a plurality of light emitting diodes (LEDs) disposed inside at least one of the pair of elongated heat sinks such that the plurality of LEDs are proximate to and directed towards a respective edge of the light guide retained by the respective elongated heat sink. The light from the plurality of LEDs enters the light guide through the respective edge of the light guide and exits the light guide through the first surface and/or the second surface of the light guide. The lighting fixture further includes an optical device that is removably coupled to the lighting fixture such that: (a) the optical device receives light exiting the light guide, and (b) the pair of end plates and the pair of elongated heat sinks overlap a perimeter of the optical device to prevent a leakage of light along the perimeter of the optical device.

In another aspect, the present disclosure can relate to a lighting fixture. In particular, the lighting fixture includes a reflector panel, a first end plate that is coupled to the reflector panel and disposed on one side of the reflector panel, and a second end plate that is coupled to the reflector panel and disposed on an opposite side of the reflector panel. Each of the first end plate and the second end plate includes a light assembly receiving portion. Further, the lighting fixture includes a light assembly that includes a light guide. In particular, the light guide includes a first surface, a second surface facing a direction opposite the first surface, a first longitudinal edge, a second longitudinal edge positioned opposite the first longitudinal edge, a first lateral edge, and a second lateral edge positioned opposite the first lateral edge. The first and second lateral edges are bordered between an end of the first and second surfaces and an end of the first and second longitudinal edges. Further, the light assembly includes an optical device that includes a pair of latitudinal edges and a pair of longitudinal edges. Furthermore, the light assembly includes a pair of elongated heat sinks disposed opposite to each other and configured to retain and overlap the first and second longitudinal edges of the light guide, and the pair of longitudinal edges of the optical device, respectively. The light assembly also includes a plurality of light emitting diodes (LEDs) disposed inside at least one of the pair of elongated heat sinks such that the plurality of LEDs are proximate to and directed towards one of the first longitudinal edge and the second longitudinal edge of the light guide. The light from the plurality of LEDs enters the light guide through the first longitudinal edge and/or second longitudinal edge of the light guide and exits the light guide through the first surface and/or the second surface of the light guide. Further, the light assembly receiving portion of the first end plate and the second end plate receives and couples the light assembly to the lighting fixture such that: (a) the optical device receives light exiting the light guide, and (b) the first end plate, the second end plate, and the pair of elongated heat sinks overlap a perimeter of the optical device to prevent a leakage of light through the perimeter of the optical device.

These and other aspects, objects, features, and embodiments will be apparent from the following description and the appended claims.

BRIEF DESCRIPTION OF THE DRAWINGS

The foregoing and other features and aspects of the disclosure are best understood with reference to the following description of certain example embodiments, when read in conjunction with the accompanying drawings, wherein:

FIG. 1B illustrates another perspective view of the edge-lit light guide luminaire of FIG. 1A, in accordance with an example embodiment of the present disclosure;

FIG. 3 illustrates a enlarged view of a portion of the end plate of FIG. 2A with a slide-in optical device removed, in accordance with an example embodiment of the present disclosure;

FIG. 11 illustrates an enlarged top view of a portion of the edge-lit light guide luminaire of FIG. 1A with the reflector panel removed and a segment of the end plate shown as broken for illustrating the arrangement of the light assembly with respect to the end plate, in accordance with an example embodiment of the present disclosure; and FIG. 12 illustrates an enlarged side view of a portion of the edge-lit light guide luminaire of FIG. 1A for illustrating the arrangement of the light assembly with respect to the end plate, in accordance with an example embodiment of the present disclosure.

Figure 1A:
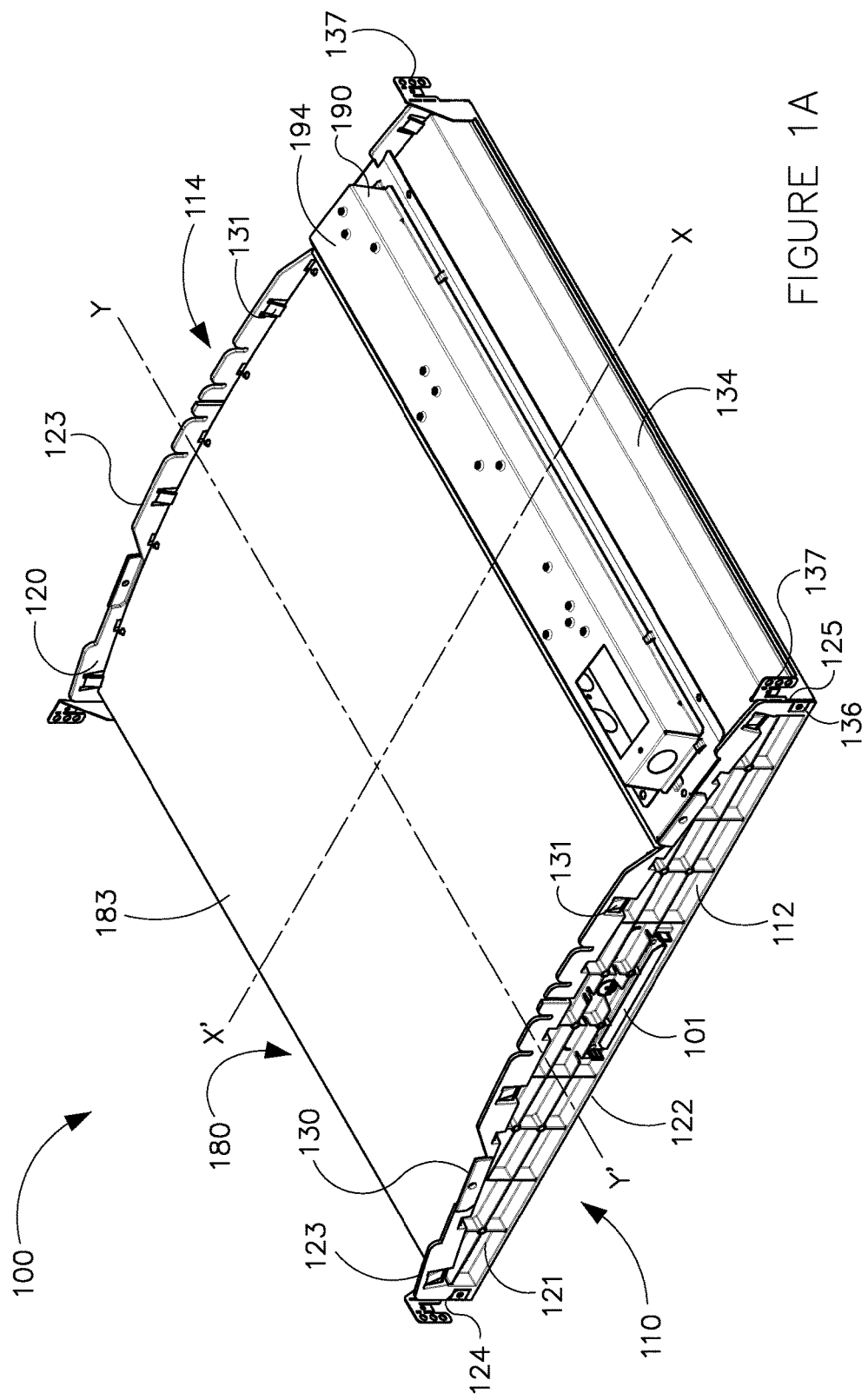
FIG. 1A illustrates a perspective view of an edge-lit light guide luminaire, in accordance with an example embodiment of the present disclosure.

The drawings illustrate only example embodiments and are therefore not to be considered limiting of its scope, as the disclosure may admit to other equally effective embodiments. The elements and features shown in the drawings are not necessarily to scale, emphasis instead being placed upon clearly illustrating the principles of the example embodiments. Additionally, certain dimensions or positioning may be exaggerated to help visually convey such principles.

BRIEF DESCRIPTION OF EXAMPLE EMBODIMENTS

In the following paragraphs, the present disclosure will be described in further detail by way of examples with reference to the attached drawings. In the description, well known components, methods, and/or processing techniques are omitted or briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s).

The present disclosure is directed to an example edge-lit light guide luminaire that includes at least a reflector panel; two end plates, each disposed on opposite ends of the reflector panel; and two heat sink rails (e.g., extrusions, sheet metal) disposed in between the end plates such that the end plates are on opposite ends of the heat sink rails. The end plates and the heat sink rails are configured to house an edge-lit light guide (herein 'light guide') and a slide-in optical device below the light guide such that there is a gap (e.g., air gap) between the light guide and the slide-in optical device. Further, the combination of the heat sink rails and the end plates capture the perimeter of the slide-in optical device to prevent light leakage around the perimeter of the slide-in optical device.

For example, the end plates of the example edge-lit light guide luminaire have slots through which the slide-in optical device may pass or slide into the luminaire. Further, the end plate slots mate with grooves in the heat sink rails that capture the edges of the slide-in optical device and securely retain the slide-in optical device within the edge-lit light guide luminaire. That is, the end plates retain a pair of opposite edges (e.g., shorter or lateral edges) of the slide-in device while the side rails retain the other pair of opposite edges (e.g., longer or longitudinal edges) of the slide-in optical device resulting in a complete perimeter overlap of the slide-in optical device that prevents light leaks along the perimeter and creates the appearance of a clean and uniformly lit luminaire (particularly, the light guide). Further, the slide-in feature associated with the optical device allows a user to easily replace the optical device in the field. For example, the user may slide out an existing optical device that provides one light distribution pattern and slide-in a replacement/new optical device that produces another light distribution pattern of the user's choice without having to disassemble the luminaire. Furthermore, the arrangement of the light guide and the slide-in optical device with a separation/gap (e.g., air gap) in between allows better suppression of the hot spot effect from the light sources that illuminate the light guide.

In the present disclosure, the slide-in optical device may include a diffuser and/or a reflector. However, one of ordinary skill in the art can understand and appreciate that in some embodiments, the slide-in optical device may include any other appropriate optical device that may be functionally similar to a diffuser or a reflector. Alternatively, the slide-in optical device may include any other appropriate optical device that can reduce or mask the glare or hot spot effect, provide an appearance of uniform brightness, and/or provide any desired light distribution or diffusion pattern. In some other example embodiments, the light guide may be configured to provide functionality of the diffuser and/or the reflector, thereby eliminating the need for a slide-in optical device.

Further, even though the present disclosure describes the slide-in optical device as being positioned below the light guide, i.e., the slide-in optical device is exposed to the viewer, one of ordinary skill in the art can understand and appreciate that in some embodiments, the light guide may be positioned below the slide-in device without departing from a broader scope of the present disclosure. Furthermore, even though the present disclosure describes the luminaire as including one slide-in optical device used in concert with the light guide, one of ordinary skill in the art can understand and appreciate that in some example embodiments, the luminaire may include more than one slide-in optical device, i.e., diffuser and/or reflector used in concert with one or more light guides without departing from a broader scope of the present disclosure. For example, the luminaire may be configured to (a) receive more than one diffuser and/or reflector through the end plate slots and (b) hold more than one diffuser and/or reflector in the groove of the heat sink rails to achieve different light distribution or diffusion patterns.

The technology of the present disclosure can be embodied in many different forms and should not be construed as limited to the embodiments set forth herein; rather, these embodiments are provided so that this disclosure will be thorough and complete, and will fully convey the scope of the technology to those having ordinary skill in the art. Furthermore, all "examples" or "example embodiments" given herein are intended to be non-limiting and among others supported by representations of the present technology.

Figure 1C:
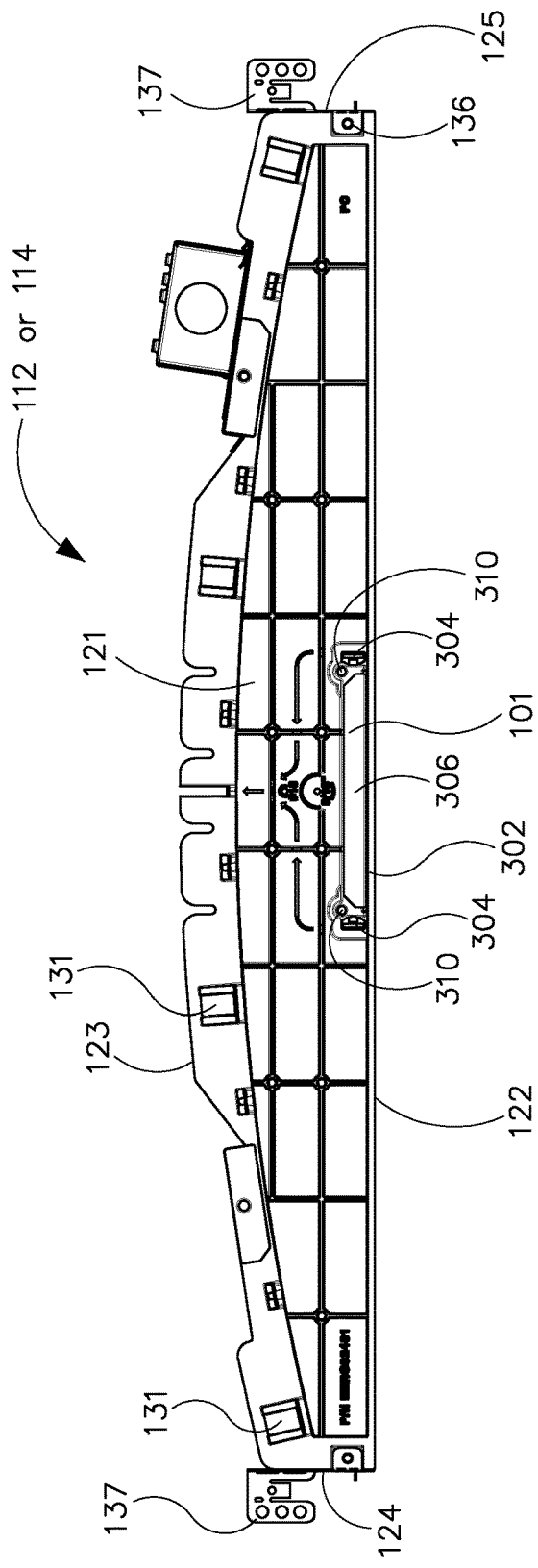
FIG. 1C illustrates a side view of the edge-lit light guide luminaire of FIG. 1A, in accordance with an example embodiment of the present disclosure.

FIGS. 1A-1C (collectively also referred to as 'FIG. 1') illustrate different views of the edge-lit light guide luminaire, in accordance with an example embodiment of the present disclosure. In particular, FIG. 1A illustrates a perspective view of an edge-lit light guide luminaire, in accordance with an example embodiment of the present disclosure; FIG. 1B illustrates another perspective view of the edge-lit light guide luminaire of FIG. 1A, in accordance with an example embodiment of the present disclosure; and FIG. 1C illustrates a side view of the edge-lit light guide luminaire of FIG. 1A, in accordance with an example embodiment of the present disclosure. Further, FIGS. 2A-2B (collectively also referred to as 'FIG. 2') illustrate different views of an end plate of the edge-lit light guide luminaire, in accordance with an example embodiment of the present disclosure. In particular, FIG. 2A illustrates a perspective view of an end plate of the edge-lit light guide luminaire of FIG. 1A showing an exterior surface of the end plate, in accordance with an example embodiment of the present disclosure; and FIG. 2B illustrates another perspective view of the end plate of FIG. 2A showing an interior surface of the end plate of the edge-lit light guide luminaire of FIG. 1A, in accordance with an example embodiment of the present disclosure.

Figure 2A:
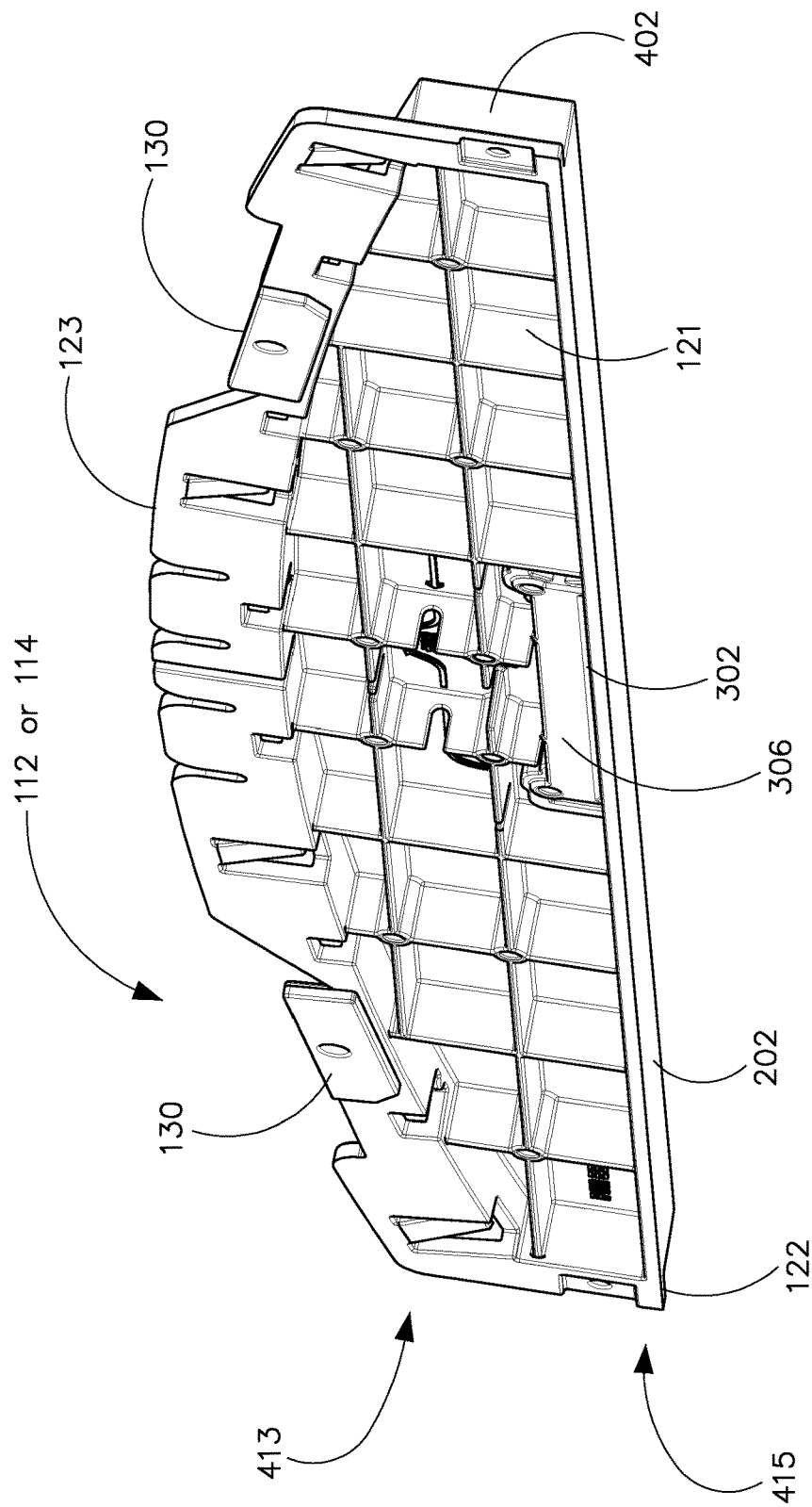
FIG. 2A illustrates a perspective view of an end plate of the edge-lit light guide luminaire of FIG. 1A showing an exterior surface of the end plate, in accordance with an example embodiment of the present disclosure.
Figure 2B:
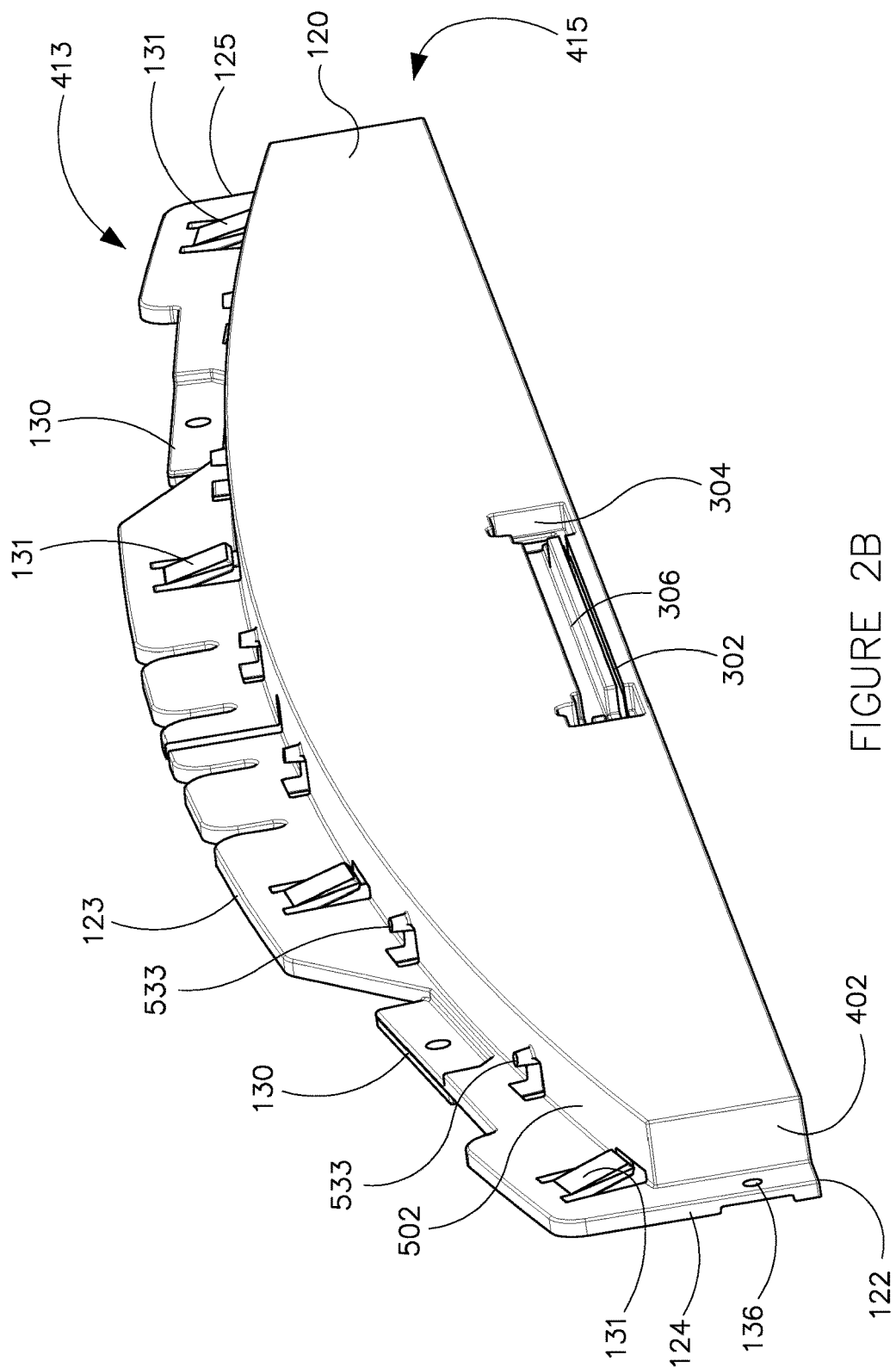
FIG. 2B illustrates another perspective view of the end plate of FIG. 2A showing an interior surface of the end plate of the edge-lit light guide luminaire of FIG. 1A, in accordance with an example embodiment of the present disclosure.
Figure 4:
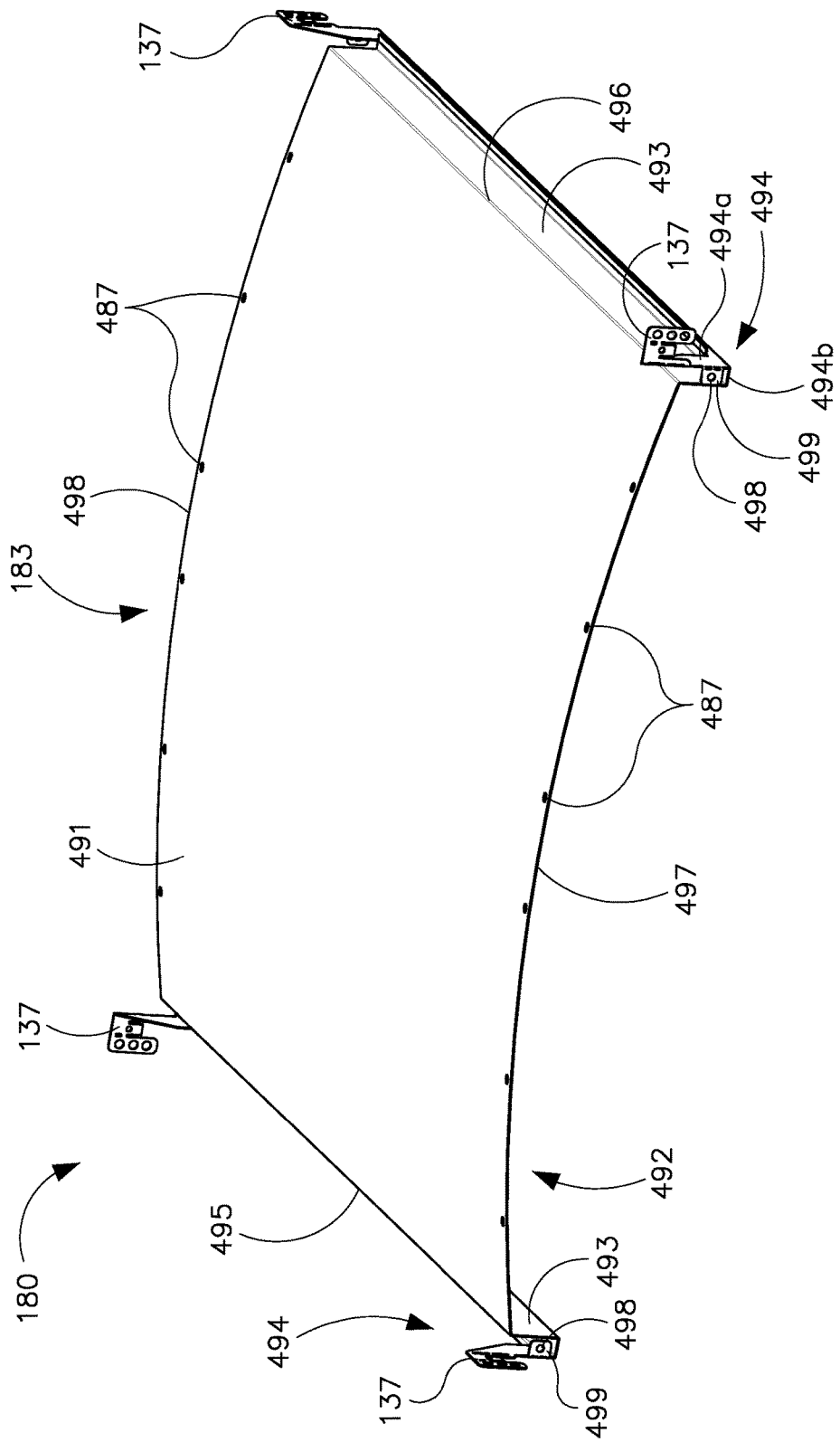
FIG. 4 illustrates a perspective view of the reflector panel of the edge-lit light guide luminaire of FIG. 1A, in accordance with an example embodiment of the present disclosure.
Figure 5:
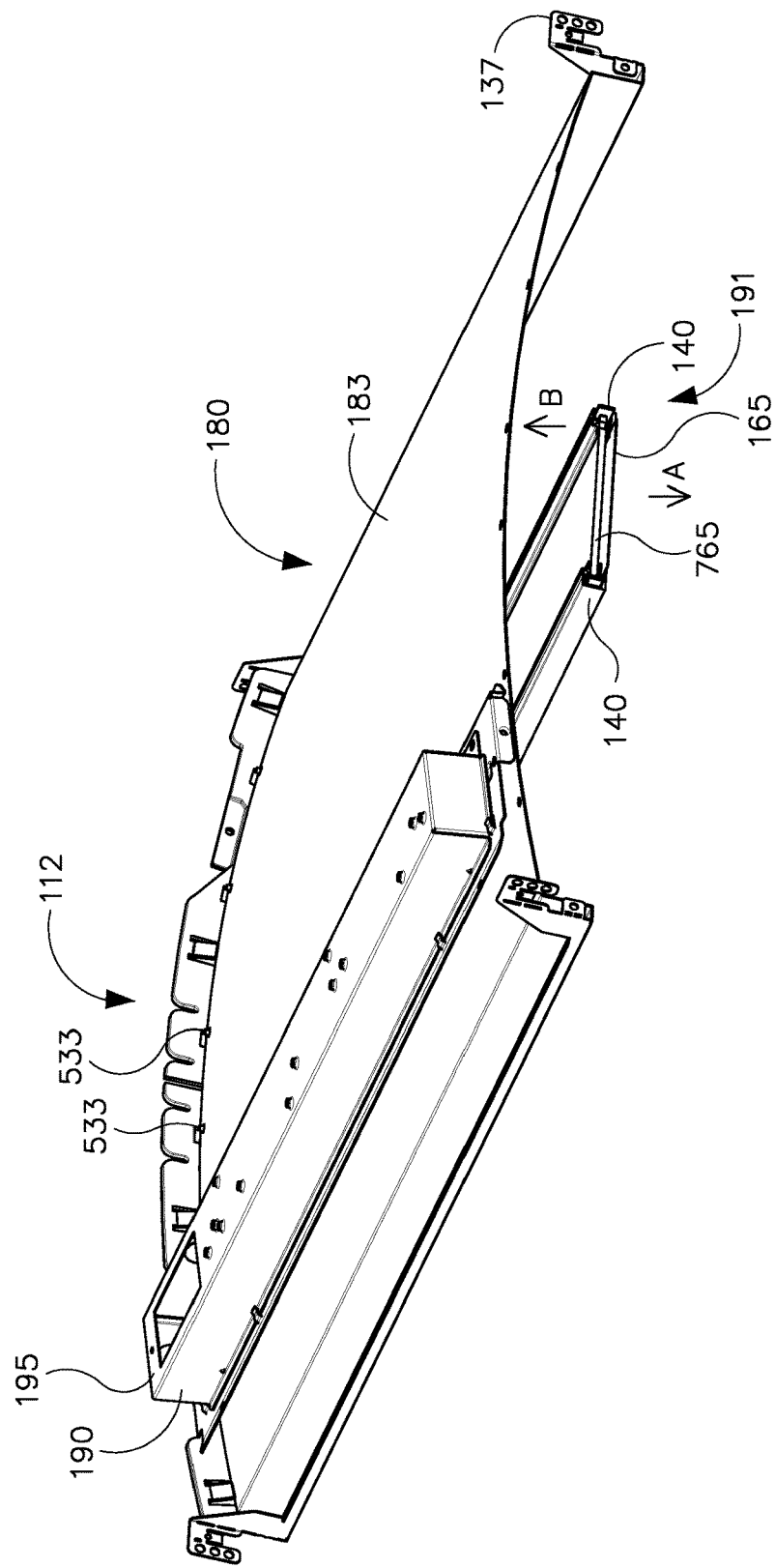
FIG. 5 illustrates a perspective view of the edge-lit light guide luminaire of FIG. 1A with one end plate removed, in accordance with an example embodiment of the present disclosure.
Figure 6:
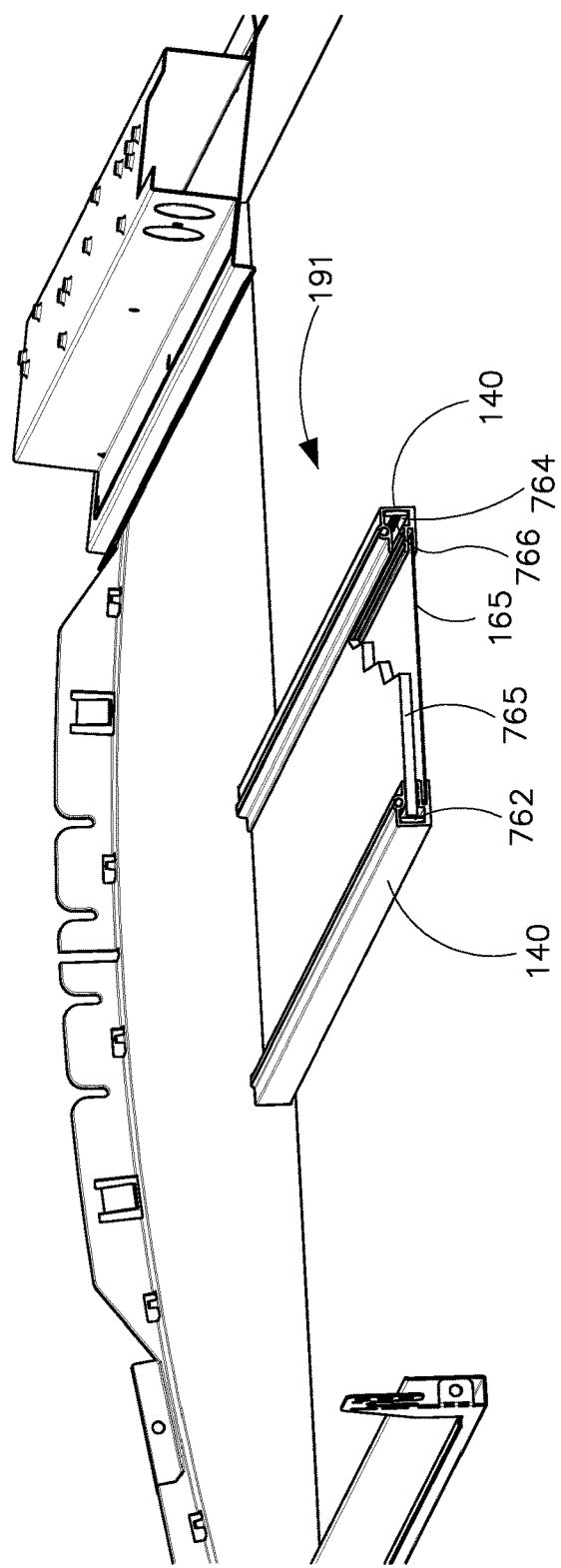
FIG. 6 illustrates a cross-sectional view of the edge-lit light guide luminaire of FIG. 1A along the X-X' axis with the reflector panel and one end plate removed; and with a portion of the light guide shown as broken for highlighting how the ends of the light guide are captured by the side rails, in accordance with an example embodiment of the present disclosure.
Figure 7:
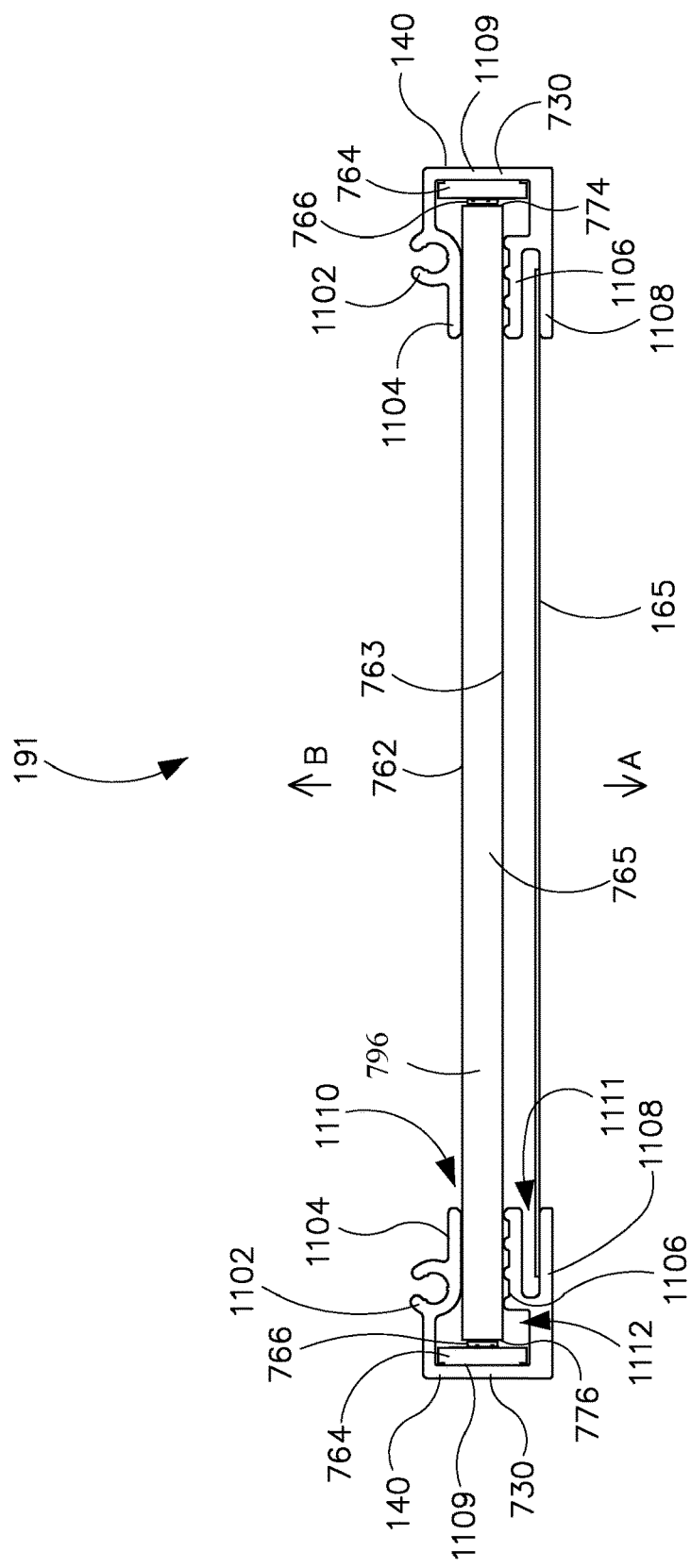
FIG. 7 illustrates a cross-sectional view of a light assembly of the edge-lit light guide luminaire of FIG. 1A, in accordance with an example embodiment of the present disclosure.
Figure 8:
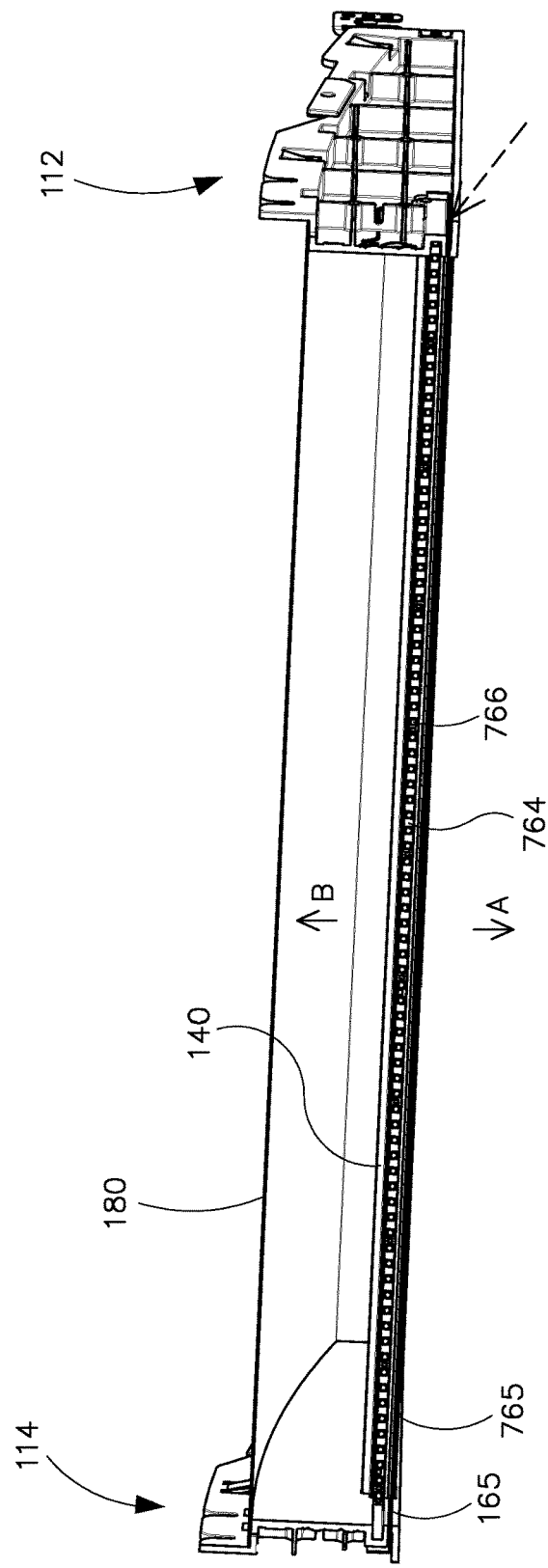
FIG. 8 illustrates a cross-sectional view of the edge-lit light guide luminaire of FIG. 1A along the Y-Y' axis, in accordance with an example embodiment of the present disclosure.
Figure 9:
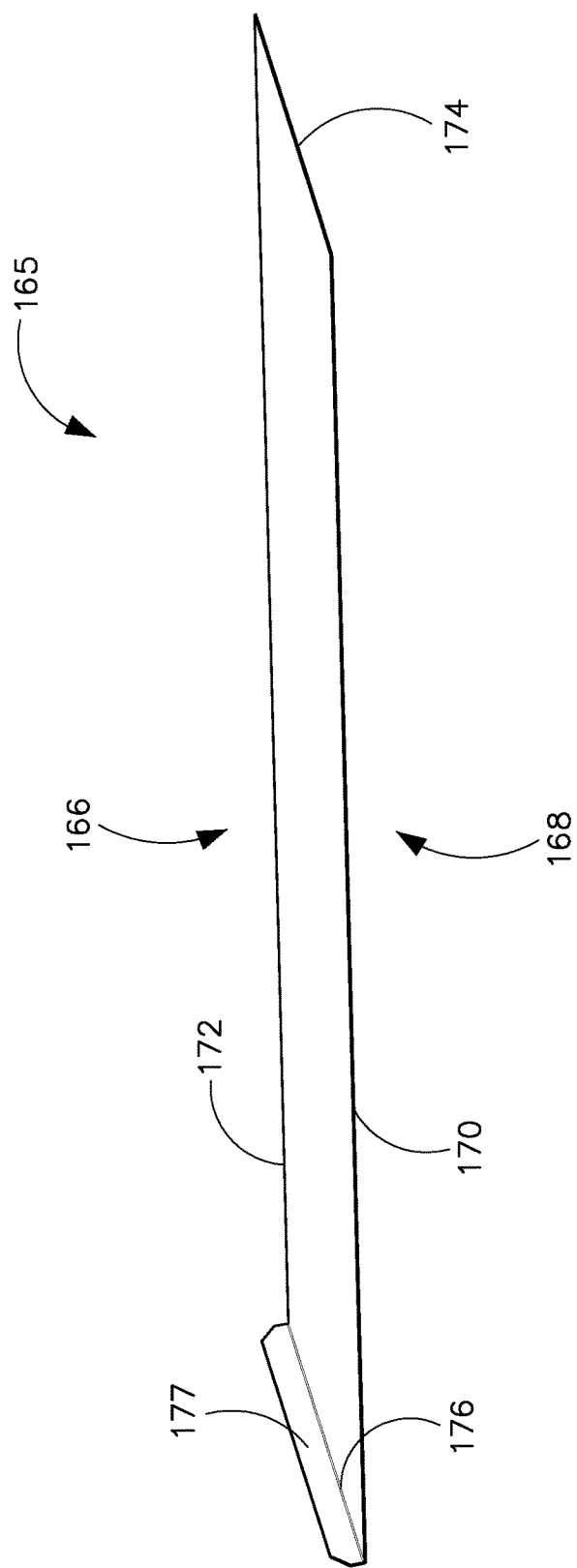
FIG. 9 illustrates a perspective view of the slide-in optical device of the edge-lit light guide luminaire of FIG. 1A, in accordance with an example embodiment of the present disclosure.
Figure 10:
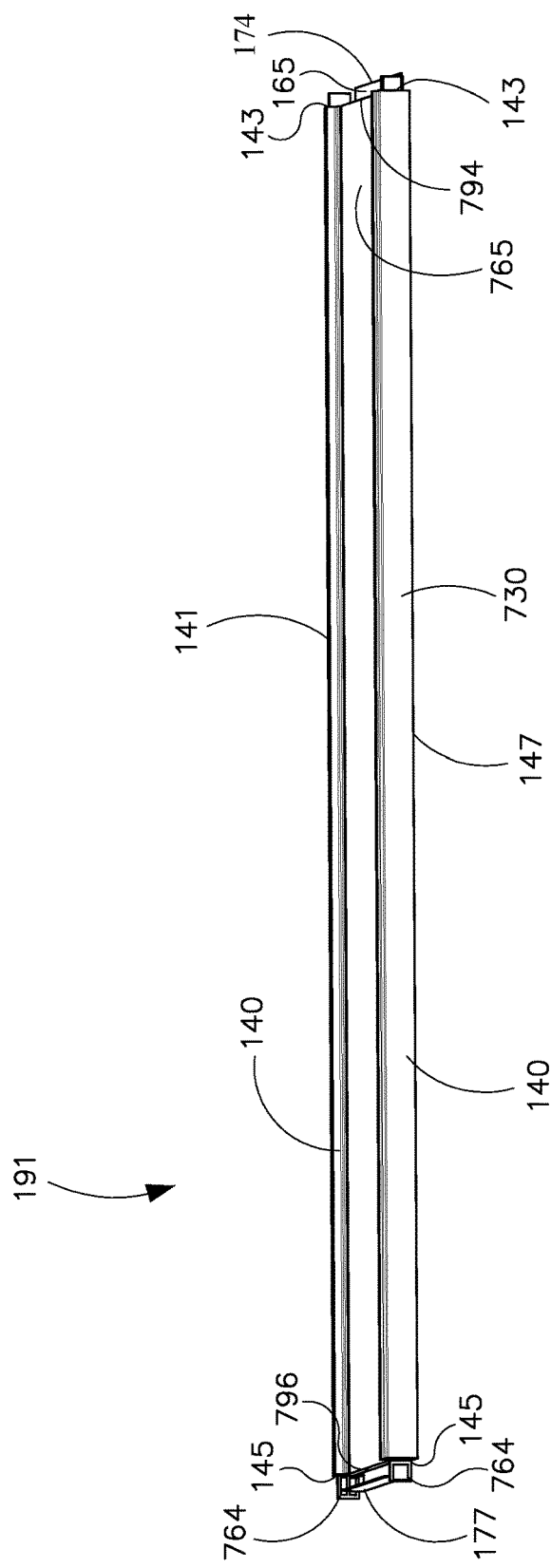
FIG. 10 illustrates a perspective view of the light assembly of the edge-lit light guide luminaire of FIG. 1A, in accordance with an example embodiment of the present disclosure.

Furthermore, FIG. 3 illustrates a enlarged view of a portion of the end plate of FIG. 2A with a slide-in device removed, in accordance with an example embodiment of the present disclosure; FIG. 4 illustrates a perspective view of the reflector panel of the edge-lit light guide luminaire of FIG. 1A, in accordance with an example embodiment of the present disclosure; FIG. 5 illustrates a perspective view of the edge-lit light guide luminaire of FIG. 1A with one end plate removed, in accordance with an example embodiment of the present disclosure; FIG. 6 illustrates a cross-sectional view of the edge-lit light guide luminaire of FIG. 1A along the X-X' axis with the reflector panel and one end plate removed; and with a portion of the light guide shown as broken for highlighting how the ends of the light guide are captured by the side rails, in accordance with an example embodiment of the present disclosure; FIG. 7 illustrates a cross-sectional view of a light assembly of the edge-lit light guide luminaire of FIG. 1A, in accordance with an example embodiment of the present disclosure; FIG. 8 illustrates a cross-sectional view of the edge-lit light guide luminaire of FIG. 1A along the Y-Y' axis, in accordance with an example embodiment of the present disclosure; FIG. 9 illustrates a perspective view of a slide-in device of the edge-lit light guide luminaire of FIG. 1A, in accordance with an example embodiment of the present disclosure; FIG. 10 illustrates a perspective view of the light assembly of the edge-lit light guide luminaire of FIG. 1A, in accordance with an example embodiment of the present disclosure; FIG. 11 illustrates an enlarged top view of a portion of the edge-lit light guide luminaire of FIG. 1A with the reflector panel removed and a segment of the end plate shown as broken for illustrating the arrangement of the light assembly with respect to the end plate, in accordance with an example embodiment of the present disclosure; and FIG. 12 illustrates an enlarged side view of a portion of the edge-lit light guide luminaire of FIG. 1A for illustrating the arrangement of the light assembly with respect to the end plate, in accordance with an example embodiment of the present disclosure.

Referring to FIGS. 1-12, the edge-lit light guide luminaire 100 (herein 'luminaire 100') may include a frame 110 and a light assembly 191. Further, in some example embodiments, the luminaire 100 may optionally also include a gear tray 190, which includes a driver (not shown) and other electrical equipment, such as wires, housed at least partially therein.

In particular, as illustrated in FIGS. 1A-1C, the frame 110 may include a first end plate 112, a second end plate 114, and a reflector panel 180 arranged such that they form a cavity 199 that is open on one side, the open side being defined by the bottom edges of the first end plate 112, the second end plate 114, and the reflector panel 180. However, in other example embodiments, the frame 110 may include greater or fewer components without departing from a broader scope of the present disclosure. Although the frame 110 illustrated in FIGS. 1A-1C includes two end plates 112 and 114, the description of both the end plates 112 and 114 is collectively provided below for the sake of brevity.

In certain example embodiments, each end plate 112, 114 may include an interior surface 120, an exterior surface 121, a bottom edge 122, a substantially curved top edge 123, a first side edge 124 extending from one end of the bottom edge 122 to a corresponding end of the top edge 123, and a second side edge 125 extending from one end of the bottom edge 122 to a corresponding end of the top edge 123. The first and second side edges 124, 125 extend substantially orthogonally away from the bottom edge 122 towards the top edge 123. Further, as illustrated in FIGS. 2A-2B, each end plate 112, 114 may include two portions, i.e., a top portion 413 and a bottom portion 415, where the bottom portion 415 may be thicker than the top portion 413. That is, the bottom portion of each end plate 112, 114 may protrude out in a direction opposite to the exterior surface 121 of the respective end plate 112, 114. Further, the bottom portion 415 that protrudes out may include a curved top ledge 502 and two side ledges 402 extending substantially perpendicular to and on either end of the curved top ledge 502 as illustrated in FIG. 2B. The side ledges 402 may be substantially parallel to the side edges 124, 125 of the respective end plate 112, 114. Furthermore, the top portion 413 of each end plate 112, 114 may extend from the substantially curved top edge 123 of the respective end plate 112, 114 to a portion of the end plate 112, 114 from which the bottom portion 415 starts, i.e., the curved top ledge 502. Although the present disclosure presents end plates having a specific shape as described above, one of ordinary skill in the art can understand and appreciate that in some example embodiments, the end plates may have any other appropriate geometric or non-geometric shapes without departing from a broader scope of the present disclosure.

In certain example embodiments, the end plates 112, 114 are fabricated from plastic, which is injection molded. However, other suitable materials, such as aluminum, other metals, metal alloys, or other polymer types, may be used to fabricate the end plates 112, 114 in other example embodiments. Regardless of the material chosen to fabricate the end plates 112, 114, at least a portion of the interior surface 120 is made to be reflective according to some example embodiments. For example, either the interior surface 120 is polished, painted with a reflective material, such as a white paint, or made to be reflective using any other methods known to people having ordinary skill in the art. Alternatively, according to some example embodiments, this interior surface 120 of the end plates 112, 114 may be non-reflective.

According to certain example embodiments, the bottom portion 415 of each end plate 112, 114 may include a light assembly receiving portion 101 located substantially at the middle of each end plate 112, 114 adjacent the bottom edge 122 of the respective end plate to receive and retain the light assembly 191 of the luminaire 100 in a substantially horizontal position, i.e., substantially parallel to the bottom edge of the end plates 112, 114. In particular, the light assembly receiving portion 101 may extend between the two side ledges 402 of the bottom portion 415 of each end plate 112, 114, but not the entire length between the two side ledges 402. In particular, the dimensions and profile of the light assembly receiving portion 101 may substantially match the dimensions and profile of the light assembly 191.

As illustrated in FIGS. 1C, 2B, and 3, the light assembly receiving portion 101 may include a first through slot 302 positioned near the bottom edge 122 of the end plate 112, 114; a second blind slot 306 located above the first through slot 302; and a pair of third through slots 304 located adjacent opposite ends of the second blind slot 306 and/or the first through slot 302. The first through slot 302 may be an elongated slot that is substantially parallel to the bottom edge 122 of the end plate 112, 114 and that extends from the interior surface 120 of the end plate 112, 114 through the exterior surface 121 of the respective end plate 112, 114. Further, the first through slot 302 may be configured to receive the slide-in optical device 165. For example, a user may insert the slide-in optical device 165 through the first through slot 302 from the exterior surface 121 of one end plate 112 into the interior cavity 199 formed by the frame 110 and towards the first through slot 302 located in the opposite end plate 114.

As illustrated in FIG. 9, the slide-in optical device 165 is substantially rectangular shaped and includes a first surface 166, a second surface 168 facing a direction opposite the first surface 166, a first longitudinal edge 170, a second longitudinal edge 172 positioned opposite the first longitudinal edge 170, a first latitudinal edge 174 positioned between one end of the first longitudinal edge 170 and the corresponding end of the second longitudinal edge 172, and a second latitudinal edge 176 positioned opposite the first latitudinal edge 174 between the first longitudinal edge 170 and the second longitudinal edge 172. Further, the slide-in optical device 165 may include a flange 177 that extends from a latitudinal edge (e.g., edge 176) of the slide-in optical device 165 and is substantially perpendicular to the first and second surface 166, 168 of the slide-in optical device 165. The flange 177 may extend upwards in a direction of the first surface 166 or downwards in a direction of the second surface 168. In particular, the flange 177 acts as a stop mechanism that prevents the slide-in device 165 that is inserted through the first through slot 302 of one end plate 112 from sliding out through the first through slot 302 of opposite end plate 114. For example, when the slide-in optical device 165 is slidingly inserted through the first through slot 302 of one end plate 112 towards the opposite end plate 114, the flange 177 engages the exterior surface 121 of the end plate 112 which stops further sliding movement of the slide-in device 165 in the direction of the opposite end plate 114, thus, preventing the slide-in optical device 165 from sliding out through the slot 302 in the opposite end plate 114.

Even though the present disclosure describes a specific shape of the slide-in device, one of ordinary skill in the art can understand and appreciate that the slide-in device 165 may be formed in any other different shape that is either geometric or non-geometric without departing from a broader scope of the present disclosure. Further, in some embodiments, the slide-in optical device 165 may include any appropriate stop mechanism in addition to or in place of the flange 177 without departing from a broader scope of the present disclosure. In some embodiments, the slide-in optical device 165 may be fabricated from an acrylic material, whereas in other example embodiments, the slide-in device 165 may be formed using other suitable materials, such as glass.

As described above, in certain example embodiments, the slide-in optical device 165 may be a reflector that reflects a first percentage of light from the light guide 765 and passes through a second percentage of light. The percentage of light reflected by the reflector may vary from 0% to 100%, i.e., the reflector may be substantially non-reflective, partially reflective, or fully reflective. Alternatively, the slide-in device 165 may be a diffuser that spreads out or scatters light in a specific manner to provide a specific light distribution pattern. In yet another example embodiment, the slide-in optical device 165 may be a combination of a reflector and a diffuser.

In either case, as illustrated in FIGS. 1-3 and 5-12, the first through slot 302 may be configured to receive a latitudinal edge 176 or 174 of the slide-in optical device 165. Accordingly, the dimensions of the first through slot 302 may substantially match the latitudinal length of the slide-in optical device 165. Alternatively, in another example embodiment, the first through slot 302 may be configured to receive a longitudinal edge 170 or 172 of the slide-in optical device 165.

Similar to the first through slot, the second blind slot 306 may also be substantially parallel to the bottom edge 122 of the end plate 112, 114. However, the second blind slot 306 may be different from the first through slot 302 in that the second blind slot 306 may not extend all the way from the interior surface 120 through the exterior surface 121 of the end plate 112, 114. Rather, the second blind slot 306 may extend from the interior surface 120 of the end plate 112, 114 towards the exterior surface 121 and may be configured to receive and secure a portion of the light guide 765 (e.g., latitudinal edge 776 or 774). Further, the second blind slot 306 may be positioned above the first through slot 302 such that the light guide 765 and the slide-in optical device 165 are separated by a gap (e.g., air gap). In some example embodiments, the gap, e.g., air gap may operate as a volumetric diffuser in addition to the diffusion or reflection provided by the slide-in optical device 165 thereby reducing the hot spot effect from the light sources of the luminaire and/or the glare thereby providing an appearance of more uniform distribution of light from the luminaire 100 to a user (viewer).

As described above, in addition to the first through slot 302 and the second blind slot 306, the light assembly receiving portion 101 of the end plate 112, 114 may also include a pair of third through slots 304. The pair of third through slots 304 may be positioned such that one third through slot 304 is located adjacent one side of the second blind slot 306 and the other third through slot 304 is located adjacent the opposite side of the second blind slot 306. In particular, each third through slot 304 may be oriented substantially perpendicular to the bottom edge 122 of the end plate 112, 114 and may be configured to receive a portion of a heat sink rail 140 of the light assembly 191 (e.g., latitudinal edge 145 or 143) and/or a portion of the LED (light emitting diode) board 764 disposed in the heat sink rail 140.

Furthermore, the light assembly receiving portion 101 of the end plate 112, 114 may include a pair of through holes 310 located above and substantially in between the second blind slot 306 and the pair of third through slots 304. In particular, one through hole 310 may be located on one side of the second blind slot 304 and the other through hole 310 may be located on the opposite side of the second blind slot 304, as illustrated in FIG. 1C. The through holes 310 may be configured to receive fasteners (e.g., screws, rivets) for coupling and securing the heat sink rails 140 to the end plates 112, 114, as will be described in greater detail below.

Referring to FIG. 2B, the curved top wall 502 of the bottom portion 415 of the end plate 112, 114 may include a plurality of boss shaped protrusions 533 spaced apart from each other. Further, the top portion 413 of each plate 112, 114 may include a plurality of bent out tabs 131 that are partially cut out from the top portion 413 of the end plates 112, 114 and bent out from the exterior surface 121 towards the interior surface 120 of the end plates 112, 114, as illustrated in FIG. 2B. In certain example embodiments, the boss shaped protrusions 533 on the top wall 502 of each end plate 112, 114 may operate in concert with the bent out tabs 131 of the respective end plates 112, 114 to couple and securely retain the reflector panel 180 to the end plates 112, 114, as will be described in greater detail below.

Referring to FIG. 4, the luminaire 100 includes a reflector panel 180. In particular, the reflector panel 180 may include a top reflector portion 183 that has an external surface 491, an internal surface 492 that is opposite to the external surface 491 and faces the cavity 199 formed by the frame 110 (or faces the light assembly 191), a first latitudinal edge 495, a second latitudinal edge 496, a first longitudinal edge 497 that extends from one end of the first latitudinal edge 495 to a corresponding end of the second latitudinal edge 496, and a second longitudinal edge 498 opposite to the first longitudinal edge 497 and extending from the first latitudinal edge 495 to the second latitudinal edge 496. The top reflector portion 183 of the reflector panel 180 may be curved shaped according to some example embodiments, while in others, the top reflector portion 183 may be substantially planar, or flat-paneled.

In an example embodiment where the top reflector portion 183 has a curved shape, the first and second longitudinal edges (497, 498) of the reflector panel 180 may be curved as well. In particular, the profile of the curved top reflector portion 183 and the first and second longitudinal edges (497, 498) may substantially match the profile of the curved top wall 502 of the end plates 112, 114. However, one of ordinary skill in the art can understand and appreciate that the shape of the reflector panel 180 may produce a desired light output and accordingly can be varied from that shown in FIGS. 1 and 4 to provide a different light output as desired by a user.

According to certain example embodiments, the internal surface 492 of the reflector panel 180 may be fabricated using a reflective material or may be fabricated using a non-reflective material and subsequently made to be reflective. For example, the internal surface 492 of the reflector panel 180 may be polished according to some exemplary embodiments or may be painted to be made reflective. Hence, some light emitted from the light guide 765 of the light assembly 191 and directed towards the internal surface 492 of the reflector panel 180 may be reflected downwardly by the reflector panel 180 to a desired area to be lit, for example, a room or a hallway.

Further, as illustrated in FIG. 4, the reflector panel 180 may include two side panels 493, each side panel 493 extending substantially perpendicular to the top reflector portion 183 from opposite edges of the top reflector panel 183 (e.g., latitudinal edges or short edges), respectively. Further, the reflector panel 180 may include a pair of substantially L-shaped flanges 494, each substantially L-shaped flange 494 (herein 'L-shaped flange') extending from a bottom edge (e.g., edge away from the top reflector portion 183) of each side panel 493, respectively, such that a short leg 494b of the L-shaped flange 494 may be substantially perpendicularly to the side panel 493 and the long leg 494a of the L-shaped flange 494 may be substantially parallel to the side panel 493. Furthermore, the reflector panel 180 may include a coupling tab 499 extending substantially perpendicularly from the long leg 494a of the L-shaped flange 494 in the direction of the corresponding side panel 493. The coupling tab 499 may include an aperture 489. As illustrated in FIGS. 1 and 4, the long leg 494a of the L-shaped flange 494 may further include a mounting tab 137 that extends substantially perpendicularly from the long leg 494a of the L-shaped flange 494 away from the corresponding side panel 493. The mounting tab 137 may include one or more apertures that may be used to mount or couple the luminaire to a mounting surface.

Furthermore, the reflector panel 180 may include a plurality of through apertures 487 located along the longitudinal length of the top reflector portion 183 and adjacent the longitudinal edges 497 and 498 of the top reflector portion 183. The plurality of through apertures 487 may extend from the external surface 491 through the internal surface 492 of the top reflector portion 183. In particular, the plurality of through apertures 487 may be spaced apart from each other such that they align with the boss shaped projections 533 of the end plates 112, 114.

In certain example embodiments, the reflector panel 180 may be coupled to the end plates 112, 114 by positioning the reflector panel 180 above the end plates 112, 114 (on opposite edges of the reflector panel 180) such that the one or more through apertures 487 adjacent each longitudinal edge 497, 498 of the reflector panel 180 is aligned with the one or more boss shaped protrusions 533 of the respective end plate 112, 114. For example, the plurality of through apertures 497 adjacent the first longitudinal edge 497 of the reflector panel 180 may be aligned with the boss shaped projections 533 of a first end plate 112 while the through apertures 497 adjacent the second longitudinal edge 498 of the reflector panel 180 may be aligned with the boss shaped projections 533 of a second end plate 114. Further, the reflector panel 180 is lowered such that the one or more apertures 487 of the reflector panel 180 engages the boss shaped projections 533 of each end plate 112, 114 on each side of the reflector panel 180 and each longitudinal edge (497, 498) of the reflector panel 180 rests on the top curved wall 502 of a respective end plate 112, 114. Additionally, the aperture 489 of each of the reflector panel's coupling tab 499 may be axially aligned with a respective aperture 136 of the end plates 112, 114. Responsively, a fastener may be received through the axially aligned aperture 489 of the reflector panel 180 and the aperture 136 of the respective end plate (112, 114) to securely couple and retain the reflector panel 180 to each end plate 112, 114. Each end plate 112, 114 may include at least two apertures 136, each located between a side edge 124, 125 of the end plate 112, 114 and a respective side ledge 402 of the end plate 112, 114.

Further, a lower end of each bent out tab 131 may be positioned substantially at the same position as the reflector 180 in order to provide support for holding the reflector 180 in position. Hence, the bent out tabs 131 are provided for snapping in, installing, or coupling the reflector 180 to the frame 110. According to some example embodiments, each end plate 112, 114 includes four bent out tabs 131 formed therein. However, in alternative example embodiments, greater or fewer bent out tabs 131 are formed within each end plate 112, 114. Further, the number of bent out tabs 131 formed in each of the end plates 112, 114 can be different from one another.

According to some example embodiments, the bent out tabs 131 are aligned in an intermittent curved-shape when viewed along any one end of the end plate 112, 114 and receives a curved-shape reflector 180. However, in some other example embodiments, the bent out tabs 131 are aligned in an intermittent and substantially linear shape when viewed along any one end of the end plate 112, 114 and receives a flat shape reflector. Although a one part reflector (single-piece reflector) design and bent out tab 131 orientations have been described herein, one of ordinary skill in the art can understand and appreciate that in other example embodiments, the reflector designs and bent out tab 131 orientations may vary without departing from a broader scope of the present disclosure. For example, another such design includes the reflector being a two part component having two curved reflector portions that meet at a middle portion of the each end plate 112, 114.

Referring back to FIGS. 1-2, the top portion 413 of each end plate 112, 114 may further include one or more wireway tabs 130 formed along, or molded into, the top portion 413 near the top edge 123 of the respective end plates 112, 114 and extend from the top edge 123 towards the bottom edge 122. The entire wireway tab 130 is positioned above the reflector panel 180 once the reflector panel 180 is coupled to the frame 110. According to certain example embodiments, these wireway tabs 130 are formed during the manufacture of the end plates 112, 114; however, in other example embodiments, these wireway tabs 130 are formed after the end plates 112, 114 are fabricated. The wireway tabs 130 may include apertures and may be either bendable or removable to allow one or more electrical wires (not shown) to pass through when being electrically connected from a power source (not shown) or driver (not shown) housed within the gear tray 192 to the light assembly 191. The wireway tabs 130 are substantially rectangular shaped, but are shaped into different geometric or non-geometric shapes in other example embodiments. The number of wireway tabs 130 on each end plate 112, 114 can be different in certain example embodiments. Further, the number of wireway tabs 130 formed in each of the end plates 112, 114 can be different from one another.

As illustrated in FIG. 1, the luminaire 100 may include a gear tray that is substantially rectangular shaped and includes a gear housing 190 forming a cavity (not shown) therein and an optional removable cover 194 coupled to the housing 190. Although the gear tray is rectangular shaped, the gear tray may be shaped differently in other exemplary embodiments. An LED driver may be inserted into the housing 190 and is used to supply power to and to control the light source (e.g., LEDs 766) of the light assembly 191. The LED driver is supplied power from a power source (not shown) via electrical wires (not shown), which then supplies power to the light source via different electrical wires (not shown). The electrical wires supplying power from the driver to the light source may be routed through the one or more wireway tabs 130, which are removed or manipulated to make space for routing the electrical wires in a concealed manner therethrough. The gear tray may be coupled to the exterior surface 491 of the reflector panel's top reflector portion 183 (near the latitudinal edge of the top reflector portion 183) as illustrated in FIG. 1. Optionally, a second gear tray (not shown) may be mounted on an opposite side, i.e., near the opposite latitudinal edge of the top reflector portion 183. The second gear tray may optionally house a second driver to control one or more light sources and/or a back-up battery (not shown) that provides power to the light sources during a power failure.

Further, as described above, the luminaire 100 may include a light assembly 191. In particular, the light assembly 191 may include a light guide 765, a slide-in optical device 165, a pair of heat sink rails 140, pair of circuit boards 764, and a plurality of light emitting diodes (LEDs) 766 disposed on each circuit board 764.

As illustrated in FIGS. 5-8 and 10-12, the light guide 765 may be substantially rectangular shaped and may include a first major surface 762, a second major surface 763 facing a direction opposite the first major surface 762, a first longitudinal edge 776, a second longitudinal edge 774 positioned opposite the first longitudinal edge 776, a first latitudinal edge 796 disposed between the first major surface 762 and the second major surface 763 and between the first longitudinal edge 776 and the second longitudinal edge 774, and a second latitudinal edge 794 positioned opposite the first latitudinal edge 796 and disposed between the first major surface 762 and the second major surface 763 and between the first longitudinal edge 776 and the second longitudinal edge 774. Alternatively, the light guide 765 may be formed in a different shape that is either geometric or non-geometric in other exemplary embodiments. The light guide 765 may be fabricated from an acrylic material and may be substantially clear or translucent. Alternatively, the light guide 765 may be formed using other suitable materials, such as glass, and can be, or made to be, opaque, if desired. At least one of the first major surface 762 and the second major surface 763 may include features formed into the surfaces 762, 763. According to certain example embodiments, both surfaces 762, 763 may include these features. For example, the features may be etchings formed into the surfaces 762, 763. These features facilitate in bringing the light present within the light guide 765 outside of the light guide 765.

In particular, the light guide 765 may be an edge-lit light guide that is configured to receive light emitted by a light source through one or more edges of the light guide 765 (e.g., latitudinal edges or longitudinal edges) and emit/exit the light through the major surfaces of the light guide 765. That is, light may enter the light guide 765 through the edges (774, 776, 794, or 796) and may exit the light guide 765 through the major surfaces (762 and/or 763).

Referring to FIG. 7, each heat sink rail 140 may be configured to receive and securely house a longitudinal edge of the light guide 765 and/or a portion of the light guide 765 surrounding or adjacent the longitudinal edge of the light guide 765. For example, one heat sink rail 140 may receive and securely house the first longitudinal edge 776 and/or a portion adjacent the first longitudinal edge 776 of the light guide 765, while the other heat sink rail 140 may receive and securely house the second longitudinal edge 774 and/or a portion adjacent the second longitudinal edge 774 of the light guide 765. In other words, the heat sink rails 140 captures and overlaps the longitudinal edges 776, 774 of the light guide 765.

As illustrated in FIGS. 7 and 10, each heat sink rail 140 may include a first latitudinal edge 143, a second latitudinal edge 145, a top longitudinal edge 141 disposed between the first latitudinal edge 143 and the second latitudinal edge 145, and a bottom longitudinal edge 147 disposed opposite to the top longitudinal edge 141 and in between the first latitudinal edge 143 and the second latitudinal edge 145. Further, each heat sink rail 140 may include an elongated body 730 that extends longitudinally from the first latitudinal edge 143 to the second latitudinal edge 145. In some example embodiments, the longitudinal length of the heat sink rail 140 may depend upon and may substantially match the length of the longitudinal edge of the light guide 765.

Furthermore, as illustrated in FIG. 7, each heat sink rail 140 may include: (i) a C-shaped portion 1102, (ii) a first support arm portion 1104 extending from and adjacent the C-shaped portion 1102, (iii) a second support arm portion 1108 that extends from a bottom longitudinal edge 147 of the heat sink rail 140, (iv) a third support arm portion 1106 that extends upward from a portion of the second arm portion 1108 such that the third arm portion 1106 is disposed between the first and second arm portions 1104 and 1108; and a support wall 1109 extending between the C-shaped portion 1102/the first support arm portion 1104 and the second support arm portion 1108. In particular, the first, second, and third support arm portions (1104, 1106, and 1108) may be arranged such that they are substantially parallel to each other.

Even though the heat sink rail 140 is described as having multiple portions, one of ordinary skill in the art can understand and appreciate the heat sink rail 140 is a single piece component where the C-shaped portion 1102, the first support arm portion 1104, the second support arm portion 1108, the third support arm portion 1106, and the support wall 1109 are integral to the heat sink rail 140 and form the elongated body of the heat sink rail 140.

As illustrated in the example embodiment of FIG. 7, the heat sink rail 140 may be configured such that it includes: (i) a first elongated cavity 1110 defined by and in between the first support arm portion 1104/the C-shaped portion 1102 and the third support arm portion 1106 to securely retain a longitudinal edge 774 or 776 of the light guide 765 and/or a portion of the light guide 765 around/adjacent the respective longitudinal edge 774 or 776, (ii) a second elongated cavity 1111 positioned adjacent to and below the first elongated cavity 110 and defined by the second support arm portion 1108 and the third support arm portion 1106, and (iii) a third elongated cavity 1112 positioned adjacent to the first and second elongated cavity portions (1110, 1111) and defined by the C-shaped portion 1102, the support wall 1109, and the third support arm portion 1108. In particular, the second elongated cavity 1111 may be configured to house and/or securely retain a longitudinal edge 170 or 172 of the slide-in optical device 165 and/or a portion of the slide-in optical device 165 around/adjacent the respective longitudinal edge 170 or 172.

The third elongated cavity portion 1112 may house a circuit board 764 having a plurality of LEDs 766 disposed thereon such that the plurality of LEDs are positioned adjacent to or in close proximity to the longitudinal edge (774,776) of the light guide 765. That is, the LEDs 766 and the circuit board 764 are disposed within the third elongated cavity 1112 of each heat sink rail 140 such that a light from the LEDs 766 may be emitted into the light guide 765 through the longitudinal edges (774,776) of the light guide 765. For example, as illustrated in FIG. 7, a first heat sink rail 140 may house: (i) a first circuit board 764 having a first plurality of LEDs 766 within the third elongated cavity 1112 of the first heat sink rail 140, (ii) a first longitudinal edge 776 of the light guide 765 in the first elongated cavity 1110 in close proximity to the first plurality of LEDs 766, and (iii) a first longitudinal edge 170 of the slide-in device 165 in the second elongated cavity 1111. Similarly, a second heat sink rail 140 may house: (i) a second circuit board 764 having a second plurality of LEDs 766 within the third elongated cavity 1112 of the second heat sink rail 140, (ii) a second longitudinal edge 774 of the light guide 765 in the first elongated cavity 1110 in close proximity to the second plurality of LEDs 766, and (iii) a second longitudinal edge 172 of the slide-in device 165 in the second elongated cavity 1111. Accordingly, in said example, the light guide 765 may receive light through both the longitudinal edges 776 and 774 of the light guide 765. That is, light emitted by the first plurality of LEDs 766 may enter the light guide 765 through the first longitudinal edge 776 and light emitted by the second plurality of LEDs may enter the light guide 765 through the second longitudinal edge 774 of the light guide 765.

Even though the present disclosure describes that both the heat sink rails 140 house a circuit board 764 having LEDs 766 in their respective third elongated cavity 1112, one of ordinary skill in the art can understand and appreciate that in some embodiments, the third elongated cavity 1112 of one heat sink rail 140 may house a spring member that is configured to push against one longitudinal edge of the light guide 765 retained in the respective side rail such that the opposite longitudinal edge of the light guide 765 retained by the other side rail 140 moves towards the plurality of LEDs retained by the other side rail 140. That is, light may be emitted into the light guide 765 through only one edge of the light guide 765. The spring element arrangement may: (i) reduce a gap between the longitudinal edge of the light guide 765 and the plurality of LEDs 766 retained in an opposite heat sink rail 140, and (ii) position the longitudinal edge of the light guide 765 in close proximity to/adjacent to the plurality of LEDs 766.

In either case, the light from the plurality of LEDs 766 that enters the light guide 765 may exit the light guide 765 through the first major surface 762 and/or the second major surface 763. In particular, the second major surface 763 of the light guide 765 may be oriented in a direction A by the heat sink rails 140 for illuminating an area to be illuminated, while the major surface 762 may be oriented facing away from the area to be illuminated, e.g., in a direction B. Thus, when the luminaire 100 is installed for operation, light emitted through the first major surface 762 may provide illumination in a direction B away from the area to be illuminated, while light emitting through the second major surface 763 may be directed towards direction A, i.e., the area to be illuminated. In particular, the light emitted through the second major surface 763 may be exit the light assembly 191 through the slide-in optical device 165 which is disposed below the light guide 765. The slide-in device 165 and the light guide 765 may be arranged within the heat sink rails 140 such that an air gap exists between the slide-in optical device 165 and the light guide 765. The slide-in optical device 165 may diffuse and/or reflect the light emitted from the second major surface 763 of the light guide 765 to output light having a clean and uniform light distribution from the luminaire 100.

In some embodiments, the reflector panel 180 that is disposed above the light guide 765 may reflect the light emitted from first major surface 762 of the light guide 765 back towards (a) the light guide 765 for transmission towards the area to be illuminated, i.e., in direction A and/or (b) towards the area to be illuminated. However, in other embodiments, the reflector panel 180 may be detached from the luminaire 100, thereby providing an uplight based on the light emitted from the first major surface 762 in the direction B. Alternatively, the reflector panel 180 may be provided with openings to control an amount of uplight as desired by an application of the luminaire 100 without detaching the reflector panel 180, i.e., when the luminaire is surface mounted or suspended from the mounting surface (ceiling/cantilever).

In certain embodiments, as described above, the slide-in device 165 and/or the reflector panel 180 may comprise a mirror or any appropriate reflective surface. In other embodiments, the slide-in device 165 and/or the reflector panel 180 may comprise a diffusely reflective surface such as a surface coated with flat white paint. In yet other embodiments, the slide-in device 165 and/or the reflector panel 180 may be faceted or comprises a surface relief pattern or other features that promote directionality of light.

Further, in one example embodiment, the light guide 765 may be biased such that a majority of light is emitted through the second major surface 763 facing an area to be illuminated. For example, the light guide 765 may be configured to emit approximately 60% of the light through the second major surface 763 facing the area to be illuminated and 40% of the light through the first major surface 762 facing a direction B. One of ordinary skill in the art can understand and appreciate that the luminaire 100 can have a light guide 765 that is not biased without departing from a broader scope of the present disclosure.

In certain example embodiment, each heat sink rail 140 may be coupled to the end plates 112, 114 by sliding in a first latitudinal edge 143 of the heat sink rail 140 into one of the third through slots 304 of one end plate 112 and a second latitudinal edge 145 of the heat sink rail 140 into a corresponding third through slot 304 of the opposite end plate 114. In particular, the latitudinal edges (143, 145) of the heat sink rails 104 may be positioned within the third through slot 304 of respective end plates 112, 114 such that: (i) a C-shaped opening in the C-shaped portion 1102 of the heat sink rail 140 may be axially aligned with the through hole 310 of the respective end plate 112, 114, (ii) the second elongated cavity 1111 of the heat sink rail 140 may be aligned with the first through slot 302 of the respective end plate 112, 114 to slidingly receive and capture the slide-in optical device 165, and (iii) the first elongated cavity 1110 of the heat sink rail 140 may be aligned with the second blind slot 306 of the respective end plate 112, 114 to house the light guide 765. Responsive to positioning the latitudinal edges (143, 145) of the heat sink rails 104 within the third through slot 304 of respective end plates 112, 114, a fastener may be passed through the axially aligned C-shaped opening in the C-shaped portion 1102 of the heat sink rail 140 and the through hole 310 of the respective end plate 112, 114 to securely couple the heat sink rails 140 to each end plate 112, 114.

As illustrated in FIGS. 11 and 12 and as described above in association with FIGS. 1-3, the first through slot 302 of one end plate 112 may house the first latitudinal edge 174 and/or a portion adjacent the first latitudinal edge 174 of the slide-in device 165, while the first through slot 302 of the opposite end plate 114 houses the second latitudinal edge 176 and/or a portion adjacent the second latitudinal edge 176 of the slide-in device 165. Further, the second blind slot 306 of one end plate 112 may house the first latitudinal edge 794 and/or a portion adjacent the first latitudinal edge 794 of the he light guide 765, while the second blind slot 306 of the opposite end plate 114 houses the second latitudinal edge 796 and/or a portion adjacent the second latitudinal edge 796 of the he light guide 765. Furthermore, each third through slot 304 of one end plate 112 may house a first latitudinal edge 143 of a respective heat sink rail 140, a first latitudinal edge of a corresponding circuit board 764, and/or a portion of the respective heat sink rail 140 and the corresponding circuit board 764 that is adjacent the first latitudinal edge 143 of the respective heat sink rail 140 and the first latitudinal edge of the corresponding circuit board 764, respectively. Similarly, each third through slot 304 of the opposite end plate 114 may house a second latitudinal edge 145 of a respective heat sink rail 140, a second opposite latitudinal edge of a corresponding circuit board 764, and/or a portion of the respective heat sink rail 140 and its corresponding circuit board 764 that is adjacent the second latitudinal edge 143 of the respective heat sink rail 140 and the second opposite latitudinal edge of the corresponding circuit board 764, respectively.

In other words, as illustrated in FIGS. 1B, 6, 8, 11, and 12, the latitudinal edges of the heat sink rails 140, light guide 765, and the slide-in optical device 165 may be securely retained within the light assembly receiving portion 101 of the end plates 112, 114 such that the end plates 112, 114 overlap the latitudinal edges ((794, 796), (143,145), and (174, 176)) and/or a portion adjacent the latitudinal edges ((794, 796), (143,145), and (174, 176)) of the light guide 765, the heat sink rails 140, the slide-in optical device 165, and the circuit board 764. Similarly, the side rails 140 of the luminaire 100 may be configured to retain/capture the longitudinal edges ((170, 172) and (774,776)) of the light guide 765 and the slide-in optical device 165 such that the side rails 140 overlap the longitudinal edges ((170, 172) and (774,776)) and/or a portion adjacent the longitudinal edges ((170, 172) and (774,776)) of the he light guide 765 and the slide-in device 165. In other words, the side rails 140 and the end plates 112, 114 capture at least a perimeter of the slide-in optical device 165 and/or the light guide 765 in an overlapping manner, thereby, preventing leakage of light around the perimeter of the slide-in optical device 165 and creating a clean and uniform appearance.

Turning to FIG. 10, the longitudinal length of the heat sink rails 140 (i.e., length between the latitudinal edges 143, 145) may be substantially similar to the longitudinal length of the light guide 765 (i.e., length between the latitudinal edges 796, 794). Further, the longitudinal length of the circuit board 764 may be greater than the longitudinal length of the heat sink rails 140. That is, as illustrated in FIG. 10, the circuit board 764 may longitudinally extend beyond the longitudinal length of the heat sink rails 140 on either ends of the heat sink rails 140. The portion of the circuit board 764 that extends beyond the longitudinal length of the heat sink rails 140 may include contact terminals for receiving electrical wiring from the power supply source (or LED driver) to supply electrical power to the LEDs 766 disposed on the circuit board 764. Similar to the circuit board 764, the slide-in device 165 (e.g., reflector and/or diffuser) may also longitudinally extend beyond the longitudinal length of the heat sink rails 140 on either ends of the heat sink rails 140.

Even though the present disclosure describes the elongated heat sinks 140, the end plates 112, 114, and the light assembly receiving portion 101 of the end plates as having a specific structure as discloses herein, one of ordinary skill in the art can understand and appreciate that the elongated heat sinks, the end plates, and/or the light assembly receiving portion 101 of the end plates may have different geometric or non-geometric profiles without departing from a broader scope of the present disclosure. Further, in some embodiments, each elongated heat sink may have a greater or lesser number of cavities than that described herein, and each cavity may oriented and located different from that described herein, without departing from a broader scope of the present disclosure. Furthermore, in some example embodiments, the light assembly receiving portion of each end plate may be located at any other portion of the respective end plate and may include greater or lesser number of slots than that described herein.

In addition, in some example embodiments, the reflector panel may have any other shape and structure than that described herein. For example, the reflector panel may not include the mounting tabs and apertures. Further, even though the present disclosure describes the end plates as being coupled to the reflector panel using fasteners, boss like projections, and/or snaps, one of ordinary skill in the art can understand and appreciate that in other embodiments, any other coupling mechanism may be used or alternatively, the end plates and the reflector panel may be a single integral component without departing from a broader scope of the present disclosure. Furthermore, even though the present disclosure describes the light guide and the optical device as being horizontally oriented, one of ordinary skill in the art can understand and appreciate that in other example embodiments, the light guide and the optical device may be arranged in a different orientation without departing from a broader scope of the present disclosure. For example, the light guide and/or the optical device may be oriented vertically or at an angle to the bottom edge of the end plate to achieve a different kind of light distribution. Further, even though the present disclosure describes each elongated heat sink as a single integral component, one of ordinary skill in the art can understand and appreciate that in some example embodiments, the elongated heat sink may be a multi-part component that is coupled to each other to form the elongated heat sink without departing from a broader scope of the present disclosure.

Although the disclosures provides example embodiments, it should be appreciated by those skilled in the art that various modifications are well within the scope of the disclosure. From the foregoing, it will be appreciated that an embodiment of the present disclosure overcomes the limitations of the prior art. Those skilled in the art will appreciate that the present disclosure is not limited to any specifically discussed application and that the embodiments described herein are illustrative and not restrictive. From the description of the example embodiments, equivalents of the elements shown therein will suggest themselves to those skilled in the art, and ways of constructing other embodiments of the present disclosure will suggest themselves to practitioners of the art. Therefore, the scope of the present disclosure is not limited herein.

What is claimed is:

1. A lighting fixture comprising:
   a pair of elongated heat sinks disposed opposite to each other;
   a pair of end plates, wherein each end plate is disposed on opposite ends of the pair of elongated heat sinks, respectively, such that the pair of end plates overlap the opposite ends of the pair of elongated heat sinks;
   a light guide comprising a first surface, a second surface opposite to the first surface, and a plurality of edges, wherein at least a pair of opposite edges of the plurality of edges is retained by the pair of elongated heat sinks, respectively;
   a plurality of light emitting diodes (LEDs) disposed inside at least one of the pair of elongated heat sinks such that the plurality of LEDs are proximate to and directed towards a respective edge of the light guide retained by the respective elongated heat sink,
   wherein light from the plurality of LEDs enters the light guide through the respective edge of the light guide and exits the light guide through one or both of the first surface and the second surface of the light guide; and
   an optical device that is removably coupled to the lighting fixture such that: (a) the optical device receives light exiting the light guide, and (b) the pair of end plates and the pair of elongated heat sinks overlap a perimeter of the optical device to prevent a leakage of the light along the perimeter of the optical device,
   wherein the optical device is removably coupled to the lighting fixture such that an elongated optical device housing cavity of each elongated heat sink retains and overlaps a longitudinal edge of the optical device and a first through slot of each end plate retains and overlaps a latitudinal edge of the optical device.

2. The lighting fixture of claim 1, wherein the pair of end plates and the pair of elongated heat sinks orient the light guide and the optical device horizontally.

3. The lighting fixture of claim 1, wherein the pair of end plates and the pair of elongated heat sinks orient the optical device such that the optical device is substantially parallel to the light guide, positioned below the light guide, and separate from the light guide.

4. The lighting fixture of claim 1, wherein the optical device is at least one of a reflector and a diffuser.

5. The lighting fixture of claim 1:
   wherein the plurality of edges of the light guide include a pair of latitudinal edges and a pair of longitudinal edges, and
   wherein each end plate comprises:
      the first through slot that extends from an interior surface of the end plate through an exterior surface of the end plate and configured to slidingly receive the optical device and/or remove the optical device from the lighting fixture,
      a second blind slot positioned adjacent to and above the first through slot, wherein the second blind slot extends from the interior surface of the end plate towards the exterior surface of the end plate and is configured to retain and overlap one of the pair of latitudinal edges of the light guide, and
      a pair of third through slots adjacent to the first through slot and the second blind slot, wherein each third through slot is positioned at opposite sides of the second blind slot and configured to retain and overlap a latitudinal end of an elongated heat sink of the pair of elongated heat sinks.

6. The lighting fixture of claim 5, wherein each elongated heat sink comprises:
   an elongated light source housing cavity configured to house an elongated circuit board and the plurality of LEDs disposed thereon, an elongated light guide housing cavity positioned adjacent the elongated light source housing cavity and configured to retain and overlap one of the pair of longitudinal edges of the light guide, and the elongated optical device housing cavity that is positioned below the elongated light guide housing cavity.

7. The lighting fixture of claim 6, wherein the pair of elongated heat sinks are coupled to the pair of end plates such that:

the elongated light source housing cavities of the pair of elongated heat sinks substantially align with the pair of third through slots of the pair of end plates, respectively, the elongated light guide housing cavities of the pair of elongated heat sinks substantially align with a portion of the second blind slot of the pair of end plates, respectively, and the elongated optical device housing cavities of the pair of elongated heat sinks substantially align with a portion of the first through slot of the pair of end plates, respectively.

8. The lighting fixture of claim 7, wherein the optical device is removably coupled to the lighting fixture by inserting the optical device through the first through slot of one end plate such that longitudinal edges of the optical device are retained by the elongated optical device housing cavities of the pair of elongated heat sinks and the latitudinal edges of the optical device are retained by the pair of end plates.

9. The lighting fixture of claim 1, wherein the optical device includes a flange that is substantially perpendicular to a remainder of the optical device, and wherein the flange provides a stopping mechanism that prevents the optical device from sliding out of the lighting fixture.

10. The lighting fixture of claim 1, wherein the lighting fixture further includes a reflector panel that is coupled to the end plates, and wherein the reflector panel is separate from and disposed above the light guide.

11. A lighting fixture comprising:
a reflector panel;
a first end plate coupled to the reflector panel and disposed on one side of the reflector panel;
a second end plate coupled to the reflector panel and disposed on an opposite side of the reflector panel, wherein each of the first end plate and the second end plate includes a light assembly receiving portion; and
a light assembly comprising:
a light guide that comprises a first surface, a second surface facing a direction opposite the first surface, a first longitudinal edge, a second longitudinal edge positioned opposite the first longitudinal edge, a first lateral edge, and a second lateral edge positioned opposite the first lateral edge, the first and second lateral edges bordered between an end of the first and second surfaces and an end of the first and second longitudinal edges;
an optical device comprising a pair of latitudinal edges and a pair of longitudinal edges;
a pair of elongated heat sinks disposed opposite to each other and configured to retain and overlap the first and second longitudinal edges of the light guide, and the pair of longitudinal edges of the optical device, respectively; and
a plurality of light emitting diodes (LEDs) disposed inside one of the pair of elongated heat sinks such that the plurality of LEDs are proximate to and directed towards the first longitudinal edge of the light guide, wherein light from the plurality of LEDs enters the light guide through the first longitudinal edge of the light guide and exits the light guide through one or both of the first surface and the second surface of the light guide, wherein the light assembly receiving portion of the first end plate and the second end plate receives and couples the light assembly to the lighting fixture such that: (a) the optical device receives at least a portion of the light exiting the light guide, and (b) the first end plate, the second end plate, and the pair of elongated heat sinks overlap a perimeter of the optical device to prevent a leakage of light through the perimeter of the optical device, and wherein the light assembly receiving portion of each end plate is disposed adjacent to and parallel to a bottom edge of the respective end plate.

12. The lighting fixture of claim 11, wherein the light assembly receiving portion of each end plate comprises:

a first through slot that extends from an interior surface of the end plate through an exterior surface of the end plate and is configured to receive the optical device, a second blind slot positioned adjacent to and above the first through slot, wherein the second blind slot extends from the interior surface of the end plate towards the exterior surface of the end plate and is configured to retain and overlap one of the first latitudinal edge and the second latitudinal edge of the light guide, and a pair of third through slots adjacent to the first through slot and the second blind slot, wherein each third through slot is positioned at opposite sides of the second blind slot and is configured to retain and overlap an end of an elongated heat sink of the pair of elongated heat sinks.

13. The lighting fixture of claim 12, wherein each elongated heat sink defines:

an elongated light source housing cavity configured to house an elongated circuit board and the plurality of LEDs disposed thereon, an elongated light guide housing cavity positioned adjacent the elongated light source housing cavity and configured to retain and overlap one of the first longitudinal edge and the second longitudinal edge of the light guide, and an elongated optical device housing cavity positioned below the elongated light guide housing cavity that is configured to retain and overlap a longitudinal edge of the pair of longitudinal edges of the optical device.

14. The lighting fixture of claim 13, wherein each elongated heat sink is coupled to the first end plate on one end and the second end plate at an opposite end such that:

the elongated light source housing cavities of the pair of elongated heat sinks substantially align with the pair of third through slots of the first end plate and the second end plate, respectively, the elongated light guide housing cavities of the pair of elongated heat sinks substantially align with a portion of the second blind slot of the first end plate and the second end plate, respectively, the elongated optical device housing cavities of the pair of elongated heat sinks substantially align with a portion of the first through slot of the first end plate and the second end plate, respectively.

15. The lighting fixture of claim 11, wherein the light guide is horizontally oriented within the lighting fixture, and wherein the optical device is oriented substantially parallel to the light guide.

16. The lighting fixture of claim 11, wherein the optical device is at least one of a reflector and a diffuser.

17. The lighting fixture of claim 11, wherein a top edge of each of the first end plate and the second end plate comprises one or more wireway tabs, the one or more wireway tabs being manipulated to allow the passage of one or more electrical wires to be electrically coupled to the plurality of LEDs.

18. The lighting fixture of claim 11, wherein the reflector panel is coupled to the first end plate and second end plate via a plurality of snaps and a plurality of boss like projections formed in each of the first and second end plates.

19. A lighting fixture comprising:
a first end plate and a second end plate;
a first elongated heat sink and a second elongated heat sink, the first elongated heat sink and the second elongated heat sink disposed between the first and second end plates, such that the first end plate overlaps first ends of the first and second elongated heat sinks and the second end plate overlaps second ends of the first and second elongated heat sinks;
a light guide comprising a first surface and a second surface opposite to the first surface,
wherein the light guide is disposed such that the first elongated heat sink retains a first edge of the light guide and the second elongated heat sink retains a second edge of the light guide;
a plurality of light emitting diodes (LEDs) disposed inside the first elongated heat sink such that the plurality of LEDs are proximate to and directed towards the first edge of the light guide retained by the first elongated heat sink,
wherein light from the plurality of LEDs enters the light guide through the first edge of the light guide and exits the light guide through one or both of the first surface and the second surface of the light guide; and
an optical device that is removably coupled to the lighting fixture such that: (a) the optical device receives at least a portion of the light exiting the light guide, and (b) the first and second end plates and the first and second elongated heat sinks overlap a perimeter of the optical device to prevent a leakage of the light along the perimeter of the optical device,
wherein the optical device includes a flange that is substantially perpendicular to a remainder of the optical device, and wherein the flange provides a stopping mechanism that prevents the optical device from sliding out of the lighting fixture when the optical device is inserted through a through slot of the first end plate towards a corresponding through slot of the second end plate.

* * * * *